US008869222B2

(12) United States Patent
Winograd et al.

(10) Patent No.: US 8,869,222 B2
(45) Date of Patent: Oct. 21, 2014

(54) SECOND SCREEN CONTENT

(75) Inventors: Joseph M. Winograd, San Diego, CA (US); Peter Russell Johnson, San Diego, CA (US); William Carl Houle, San Diego, CA (US)

(73) Assignee: Verance Corporation, San Diego, CA (US)

( * ) Notice: Subject to any disclaimer, the term of this patent is extended or adjusted under 35 U.S.C. 154(b) by 4 days.

(21) Appl. No.: 13/615,291

(22) Filed: Sep. 13, 2012

(65) Prior Publication Data

US 2014/0071342 A1 Mar. 13, 2014

(51) Int. Cl.
*H04N 7/173* (2011.01)
*H04H 60/32* (2008.01)
*H04N 7/10* (2006.01)

(52) U.S. Cl.
USPC .............. 725/110; 725/18; 725/19; 725/20; 725/32

(58) Field of Classification Search
USPC ................... 725/18–20, 25–32, 110
See application file for complete search history.

(56) References Cited

U.S. PATENT DOCUMENTS

| | | | |
|---|---|---|---|
| 3,406,344 A | 10/1968 | Hopper | |
| 3,842,196 A | 10/1974 | Loughlin | |
| 3,885,217 A | 5/1975 | Cintron | |
| 3,894,190 A | 7/1975 | Gassmann | |
| 3,919,479 A | 11/1975 | Moon et al. | |
| 3,973,206 A | 8/1976 | Haselwood et al. | |
| 4,048,562 A | 9/1977 | Haselwood et al. | |
| 4,176,379 A | 11/1979 | Wessler et al. | |
| 4,199,788 A | 4/1980 | Tsujimura | |
| 4,225,967 A | 9/1980 | Miwa et al. | |
| 4,230,990 A | 10/1980 | Lert, Jr. et al. | |
| 4,281,217 A | 7/1981 | Dolby | |
| 4,295,128 A | 10/1981 | Hashemian et al. | |
| 4,425,578 A | 1/1984 | Haselwood et al. | |
| 4,454,610 A | 6/1984 | Sziklai | |
| 4,464,656 A | 8/1984 | Nakamura | |
| 4,497,060 A | 1/1985 | Yang | |
| 4,512,013 A | 4/1985 | Nash et al. | |
| 4,547,804 A | 10/1985 | Greenberg | |

(Continued)

FOREIGN PATENT DOCUMENTS

| | | | |
|---|---|---|---|
| CA | 2276638 A1 | 1/2000 | |
| EP | 282734 A1 | 9/1988 | |

(Continued)

OTHER PUBLICATIONS

"Advanced Access Content System (AACS), Pre-recorded Video Book," Revision 0.951, Sep. 2009 (86 pages).

(Continued)

*Primary Examiner* — Gigi L Dubasky
(74) *Attorney, Agent, or Firm* — Perkins Coie LLP; Donald L. Wenskay

(57) ABSTRACT

Methods, systems, devices and computer program products are provided to facilitate enhanced use and interaction with multimedia content using a variety of content identification techniques. After identifying a content that is being presented by a first device, the content identification information is used to retrieve and present a second content that would render at least a portion of the first content comprehensible to particular users or audience of the first content. The second content can be tailored to accommodate physical disabilities or special needs of a user or a group of users.

41 Claims, 6 Drawing Sheets

(56) References Cited

U.S. PATENT DOCUMENTS

| | | |
|---|---|---|
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,523,794 A | 6/1996 | Mankovitz et al. |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,809,139 A | 9/1998 | Girod et al. |
| 5,819,289 A | 10/1998 | Sanford, II et al. |
| 5,822,360 A | 10/1998 | Lee et al. |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,870,030 A | 2/1999 | DeLuca et al. |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. |
| 6,035,171 A | 3/2000 | Takaya et al. |
| 6,035,177 A | 3/2000 | Moses et al. |
| 6,037,984 A | 3/2000 | Isnardi et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardullo et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. |
| 6,160,986 A | 12/2000 | Gabai et al. |
| 6,173,271 B1 | 1/2001 | Goodman et al. |
| 6,175,627 B1 | 1/2001 | Petrovic et al. |
| 6,189,123 B1 | 2/2001 | Anders Nystrom et al. |
| 6,209,092 B1 | 3/2001 | Linnartz |
| 6,209,094 B1 | 3/2001 | Levine et al. |
| 6,222,932 B1 | 4/2001 | Rao et al. |
| 6,229,572 B1 | 5/2001 | Ciardullo et al. |
| 6,233,347 B1 | 5/2001 | Chen et al. |
| 6,246,775 B1 | 6/2001 | Nakamura et al. |

(56) References Cited

U.S. PATENT DOCUMENTS

| | | |
|---|---|---|
| 6,246,802 B1 | 6/2001 | Fujihara et al. |
| 6,249,870 B1 | 6/2001 | Kobayashi et al. |
| 6,252,972 B1 | 6/2001 | Linnartz |
| 6,253,113 B1 | 6/2001 | Lu |
| 6,253,189 B1 | 6/2001 | Feezell et al. |
| 6,268,866 B1 | 7/2001 | Shibata |
| 6,278,792 B1 | 8/2001 | Cox et al. |
| 6,282,299 B1 | 8/2001 | Tewfik et al. |
| 6,285,774 B1 | 9/2001 | Schumann et al. |
| 6,289,108 B1 | 9/2001 | Rhoads |
| 6,290,566 B1 | 9/2001 | Gabai et al. |
| 6,330,335 B1 | 12/2001 | Rhoads |
| 6,330,672 B1 | 12/2001 | Shur |
| 6,332,031 B1 | 12/2001 | Rhoads et al. |
| 6,332,194 B1 | 12/2001 | Bloom et al. |
| 6,353,672 B1 | 3/2002 | Rhoads |
| 6,363,159 B1 | 3/2002 | Rhoads |
| 6,373,974 B2 | 4/2002 | Zeng |
| 6,374,036 B1 | 4/2002 | Ryan et al. |
| 6,381,341 B1 | 4/2002 | Rhoads |
| 6,385,330 B1 | 5/2002 | Powell et al. |
| 6,388,712 B1 | 5/2002 | Shinohara et al. |
| 6,389,152 B2 | 5/2002 | Nakamura et al. |
| 6,389,538 B1 | 5/2002 | Gruse et al. |
| 6,400,826 B1 | 6/2002 | Chen et al. |
| 6,400,827 B1 | 6/2002 | Rhoads |
| 6,404,781 B1 | 6/2002 | Kawamae et al. |
| 6,404,898 B1 | 6/2002 | Rhoads |
| 6,411,725 B1 | 6/2002 | Rhoads |
| 6,415,040 B1 | 7/2002 | Linnartz et al. |
| 6,415,041 B1 | 7/2002 | Oami et al. |
| 6,424,726 B2 | 7/2002 | Nakano et al. |
| 6,427,012 B1 | 7/2002 | Petrovic |
| 6,430,301 B1 | 8/2002 | Petrovic |
| 6,430,302 B2 | 8/2002 | Rhoads |
| 6,449,367 B2 | 9/2002 | Van Wie et al. |
| 6,449,496 B1 | 9/2002 | Beith et al. |
| 6,473,560 B1 | 10/2002 | Linnartz et al. |
| 6,477,431 B1 | 11/2002 | Kalker et al. |
| 6,487,301 B1 | 11/2002 | Zhao |
| 6,490,355 B1 | 12/2002 | Epstein |
| 6,496,591 B1 | 12/2002 | Rhoads |
| 6,505,160 B1 | 1/2003 | Levy et al. |
| 6,510,233 B1 | 1/2003 | Nakano |
| 6,510,234 B1 | 1/2003 | Cox et al. |
| 6,512,837 B1 | 1/2003 | Ahmed |
| 6,523,113 B1 | 2/2003 | Wehrenberg |
| 6,529,506 B1 | 3/2003 | Yamamoto et al. |
| 6,530,021 B1 | 3/2003 | Epstein et al. |
| 6,550,011 B1 | 4/2003 | Sims, III |
| 6,553,127 B1 | 4/2003 | Kurowski |
| 6,556,688 B1 | 4/2003 | Ratnakar |
| 6,557,103 B1 | 4/2003 | Boncelet, Jr. et al. |
| 6,570,996 B1 | 5/2003 | Linnartz |
| 6,571,144 B1 | 5/2003 | Moses et al. |
| 6,574,350 B1 | 6/2003 | Rhoads et al. |
| 6,577,744 B1 | 6/2003 | Braudaway et al. |
| 6,584,138 B1 | 6/2003 | Neubauer et al. |
| 6,590,996 B1 | 7/2003 | Reed et al. |
| 6,590,997 B2 | 7/2003 | Rhoads |
| 6,591,365 B1 | 7/2003 | Cookson |
| 6,592,516 B2 | 7/2003 | Lee |
| 6,598,162 B1 | 7/2003 | Moskowitz |
| 6,614,914 B1 | 9/2003 | Rhoads et al. |
| 6,618,484 B1 | 9/2003 | Van Wie et al. |
| 6,625,297 B1 | 9/2003 | Bradley |
| 6,628,729 B1 | 9/2003 | Sorensen |
| 6,633,653 B1 | 10/2003 | Hobson et al. |
| 6,636,615 B1 | 10/2003 | Rhoads et al. |
| 6,636,967 B1 | 10/2003 | Koyano |
| 6,647,128 B1 | 11/2003 | Rhoads |
| 6,647,129 B2 | 11/2003 | Rhoads |
| 6,654,501 B1 | 11/2003 | Acharya et al. |
| 6,661,905 B1 | 12/2003 | Chupp et al. |
| 6,665,419 B1 | 12/2003 | Oami |
| 6,668,068 B2 | 12/2003 | Hashimoto |
| 6,671,376 B1 | 12/2003 | Koto et al. |
| 6,671,388 B1 | 12/2003 | Op De Beeck et al. |
| 6,674,861 B1 | 1/2004 | Xu et al. |
| 6,674,876 B1 | 1/2004 | Hannigan et al. |
| 6,675,146 B2 | 1/2004 | Rhoads |
| 6,678,389 B1 | 1/2004 | Sun et al. |
| 6,681,029 B1 | 1/2004 | Rhoads |
| 6,683,958 B2 | 1/2004 | Petrovic |
| 6,697,944 B1 | 2/2004 | Jones et al. |
| 6,700,990 B1 | 3/2004 | Rhoads |
| 6,704,431 B1 | 3/2004 | Ogawa et al. |
| 6,707,926 B1 | 3/2004 | Macy et al. |
| 6,721,439 B1 | 4/2004 | Levy et al. |
| 6,728,390 B2 | 4/2004 | Rhoads et al. |
| 6,737,957 B1 | 5/2004 | Petrovic et al. |
| 6,738,495 B2 | 5/2004 | Rhoads et al. |
| 6,744,906 B2 | 6/2004 | Rhoads et al. |
| 6,748,360 B2 | 6/2004 | Pitman et al. |
| 6,751,337 B2 | 6/2004 | Tewfik et al. |
| 6,757,908 B1 | 6/2004 | Vogel |
| 6,768,807 B1 | 7/2004 | Muratani |
| 6,771,797 B2 | 8/2004 | Ahmed |
| 6,785,399 B2 | 8/2004 | Fujihara |
| 6,785,401 B2 | 8/2004 | Walker et al. |
| 6,785,815 B1 | 8/2004 | Serret-Avila et al. |
| 6,792,542 B1 | 9/2004 | Lee et al. |
| 6,798,893 B1 | 9/2004 | Tanaka |
| 6,801,999 B1 | 10/2004 | Venkatesan et al. |
| 6,823,455 B1 | 11/2004 | Macy et al. |
| 6,829,368 B2 | 12/2004 | Meyer et al. |
| 6,829,582 B1* | 12/2004 | Barsness ............ 704/275 |
| 6,834,344 B1 | 12/2004 | Aggarwal et al. |
| 6,834,345 B2 | 12/2004 | Bloom et al. |
| 6,850,555 B1 | 2/2005 | Barclay |
| 6,850,626 B2 | 2/2005 | Rhoads et al. |
| 6,856,693 B2 | 2/2005 | Miller |
| 6,871,180 B1 | 3/2005 | Neuhauser et al. |
| 6,880,082 B2 | 4/2005 | Ohta |
| 6,888,943 B1 | 5/2005 | Lam et al. |
| 6,891,958 B2 | 5/2005 | Kirovski et al. |
| 6,912,010 B2 | 6/2005 | Baker et al. |
| 6,912,294 B2 | 6/2005 | Wang et al. |
| 6,912,315 B2 | 6/2005 | Wong et al. |
| 6,915,002 B2 | 7/2005 | Gustafson |
| 6,915,422 B1 | 7/2005 | Nakamura |
| 6,915,481 B1 | 7/2005 | Tewfik et al. |
| 6,928,233 B1 | 8/2005 | Walker et al. |
| 6,931,536 B2 | 8/2005 | Hollar |
| 6,944,313 B1 | 9/2005 | Donescu |
| 6,944,771 B2 | 9/2005 | Epstein |
| 6,947,893 B1 | 9/2005 | Iwaki et al. |
| 6,952,774 B1 | 10/2005 | Kirovski et al. |
| 6,954,541 B2 | 10/2005 | Fan et al. |
| 6,961,854 B2 | 11/2005 | Serret-Avila et al. |
| 6,973,195 B1 | 12/2005 | Matsui |
| 6,993,154 B2 | 1/2006 | Brunk |
| 6,996,249 B2 | 2/2006 | Miller et al. |
| 7,007,166 B1 | 2/2006 | Moskowitz et al. |
| 7,020,304 B2 | 3/2006 | Alattar et al. |
| 7,024,018 B2 | 4/2006 | Petrovic |
| 7,043,049 B2 | 5/2006 | Kuzma |
| 7,043,536 B1 | 5/2006 | Philyaw et al. |
| 7,043,638 B2 | 5/2006 | McGrath et al. |
| 7,046,808 B1 | 5/2006 | Metois et al. |
| 7,054,461 B2 | 5/2006 | Zeller et al. |
| 7,054,462 B2 | 5/2006 | Rhoads et al. |
| 7,058,809 B2 | 6/2006 | White et al. |
| 7,058,815 B2 | 6/2006 | Morin |
| 7,068,809 B2 | 6/2006 | Stach |
| 7,072,492 B2 | 7/2006 | Ogawa et al. |
| 7,103,678 B2 | 9/2006 | Asai et al. |
| 7,107,452 B2 | 9/2006 | Serret-Avila et al. |
| 7,111,169 B2 | 9/2006 | Ripley et al. |
| 7,113,613 B2 | 9/2006 | Echizen et al. |
| 7,142,691 B2 | 11/2006 | Levy |
| 7,162,642 B2 | 1/2007 | Schumann et al. |
| 7,164,778 B1 | 1/2007 | Nakamura et al. |
| 7,167,599 B1 | 1/2007 | Diehl |

(56) References Cited

U.S. PATENT DOCUMENTS

| | | |
|---|---|---|
| 7,171,020 B2 | 1/2007 | Rhoads et al. |
| 7,177,429 B2 | 2/2007 | Moskowitz et al. |
| 7,197,368 B2 | 3/2007 | Kirovski et al. |
| 7,206,649 B2 | 4/2007 | Kirovski et al. |
| 7,224,819 B2 | 5/2007 | Levy et al. |
| 7,231,061 B2 | 6/2007 | Bradley |
| 7,289,643 B2 | 10/2007 | Brunk et al. |
| 7,298,865 B2 | 11/2007 | Lubin et al. |
| 7,319,759 B1 | 1/2008 | Peinado et al. |
| 7,321,666 B2 | 1/2008 | Kunisa |
| 7,334,247 B1 | 2/2008 | Finseth et al. |
| 7,336,802 B2 | 2/2008 | Kunisa |
| 7,346,514 B2 | 3/2008 | Herre et al. |
| 7,369,677 B2 | 5/2008 | Petrovic et al. |
| 7,389,421 B2 | 6/2008 | Kirovski et al. |
| 7,430,670 B1 | 9/2008 | Horning et al. |
| 7,450,727 B2 | 11/2008 | Griesinger |
| 7,454,019 B2 | 11/2008 | Williams |
| 7,562,392 B1 | 7/2009 | Rhoads et al. |
| 7,581,103 B2 | 8/2009 | Home et al. |
| 7,587,601 B2 | 9/2009 | Levy et al. |
| 7,616,776 B2 | 11/2009 | Petrovic et al. |
| 7,617,509 B1 | 11/2009 | Brunheroto et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,698,570 B2 | 4/2010 | Schumann et al. |
| 7,788,684 B2 | 8/2010 | Petrovic et al. |
| 7,788,693 B2 | 8/2010 | Robbins |
| 7,818,763 B2 | 10/2010 | Sie et al. |
| 7,840,006 B2 | 11/2010 | Ogawa et al. |
| 7,979,881 B1 | 7/2011 | Wong et al. |
| 7,983,922 B2 | 7/2011 | Neusinger et al. |
| 7,986,806 B2 | 7/2011 | Rhoads |
| 7,991,995 B2 | 8/2011 | Rabin et al. |
| 8,055,013 B2 | 11/2011 | Levy et al. |
| 8,059,815 B2 | 11/2011 | Lofgren et al. |
| 8,155,463 B2 | 4/2012 | Wong et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,346,532 B2 | 1/2013 | Chakra et al. |
| 8,467,717 B2 | 6/2013 | Croy et al. |
| 8,589,969 B2 | 11/2013 | Falcon |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2001/0051996 A1 | 12/2001 | Cooper et al. |
| 2001/0054146 A1 | 12/2001 | Carro et al. |
| 2002/0007403 A1 | 1/2002 | Echizen et al. |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0068987 A1 | 6/2002 | Hars |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2002/0199106 A1 | 12/2002 | Hayashi |
| 2003/0009671 A1 | 1/2003 | Yacobi et al. |
| 2003/0012098 A1 | 1/2003 | Sako et al. |
| 2003/0012403 A1 | 1/2003 | Rhoads et al. |
| 2003/0016825 A1 | 1/2003 | Jones |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0056213 A1 | 3/2003 | McFaddin et al. |
| 2003/0061489 A1 | 3/2003 | Pelly et al. |
| 2003/0063747 A1 | 4/2003 | Petrovic |
| 2003/0072468 A1 | 4/2003 | Brunk et al. |
| 2003/0076955 A1 | 4/2003 | Alve et al. |
| 2003/0078891 A1 | 4/2003 | Capitant |
| 2003/0081809 A1 | 5/2003 | Fridrich et al. |
| 2003/0112974 A1 | 6/2003 | Levy |
| 2003/0112997 A1 | 6/2003 | Ahmed |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0174862 A1 | 9/2003 | Rhoads et al. |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093202 A1 | 5/2004 | Fischer et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0111740 A1 | 6/2004 | Seok et al. |
| 2004/0133794 A1 | 7/2004 | Kocher et al. |
| 2004/0136531 A1 | 7/2004 | Asano et al. |
| 2004/0151316 A1 | 8/2004 | Petrovic |
| 2004/0169581 A1 | 9/2004 | Petrovic et al. |
| 2004/0174996 A1 | 9/2004 | Tewfik et al. |
| 2004/0202324 A1 | 10/2004 | Yamaguchi et al. |
| 2004/0204943 A1 | 10/2004 | Kirovski et al. |
| 2004/0216157 A1 | 10/2004 | Shain et al. |
| 2004/0250078 A1 | 12/2004 | Stach et al. |
| 2004/0258274 A1 | 12/2004 | Brundage et al. |
| 2005/0008190 A1 | 1/2005 | Levy et al. |
| 2005/0010779 A1 | 1/2005 | Kobayashi et al. |
| 2005/0013462 A1 | 1/2005 | Rhoads |
| 2005/0025332 A1 | 2/2005 | Seroussi |
| 2005/0050332 A1 | 3/2005 | Serret-Avila et al. |
| 2005/0071669 A1 | 3/2005 | Medvinsky et al. |
| 2005/0120220 A1 | 6/2005 | Oostveen et al. |
| 2005/0144632 A1 | 6/2005 | Mears et al. |
| 2005/0154891 A1 | 7/2005 | Skipper |
| 2005/0196051 A1 | 9/2005 | Wong et al. |
| 2005/0202781 A1 | 9/2005 | Steelberg et al. |
| 2005/0242568 A1 | 11/2005 | Long et al. |
| 2005/0251683 A1 | 11/2005 | Levy et al. |
| 2006/0005029 A1 | 1/2006 | Petrovic et al. |
| 2006/0056653 A1 | 3/2006 | Kunisa |
| 2006/0062426 A1 | 3/2006 | Levy et al. |
| 2006/0075424 A1 | 4/2006 | Talstra et al. |
| 2006/0104477 A1 | 5/2006 | Isogai et al. |

(56) References Cited

U.S. PATENT DOCUMENTS

| | | |
|---|---|---|
| 2006/0227968 A1 | 10/2006 | Chen et al. |
| 2006/0239501 A1 | 10/2006 | Petrovic et al. |
| 2007/0003103 A1 | 1/2007 | Lemma et al. |
| 2007/0005500 A1 | 1/2007 | Steeves et al. |
| 2007/0033146 A1 | 2/2007 | Hollar |
| 2007/0039018 A1 | 2/2007 | Saslow et al. |
| 2007/0100483 A1 | 5/2007 | Kentish et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0168673 A1 | 7/2007 | Van Der Veen et al. |
| 2007/0177761 A1 | 8/2007 | Levy |
| 2007/0192261 A1 | 8/2007 | Kelkar et al. |
| 2007/0208711 A1 | 9/2007 | Rhoads et al. |
| 2007/0214049 A1 | 9/2007 | Postrel |
| 2007/0223708 A1 | 9/2007 | Villemoes et al. |
| 2008/0002854 A1 | 1/2008 | Tehranchi et al. |
| 2008/0016360 A1 | 1/2008 | Rodriguez et al. |
| 2008/0031463 A1 | 2/2008 | Davis |
| 2008/0209219 A1 | 8/2008 | Rhein |
| 2008/0228733 A1 | 9/2008 | Davis et al. |
| 2008/0273861 A1 | 11/2008 | Yang et al. |
| 2008/0298632 A1 | 12/2008 | Reed |
| 2008/0310629 A1 | 12/2008 | Van Der Veen et al. |
| 2008/0310673 A1 | 12/2008 | Petrovic et al. |
| 2008/0313741 A1 | 12/2008 | Alve et al. |
| 2009/0031134 A1 | 1/2009 | Levy |
| 2009/0033617 A1* | 2/2009 | Lindberg et al. ............... 345/156 |
| 2009/0158318 A1 | 6/2009 | Levy |
| 2009/0172405 A1 | 7/2009 | Shiomi et al. |
| 2009/0175594 A1* | 7/2009 | Ann et al. ..................... 386/95 |
| 2009/0177674 A1 | 7/2009 | Yoshida |
| 2009/0262932 A1 | 10/2009 | Petrovic |
| 2009/0319639 A1 | 12/2009 | Gao et al. |
| 2009/0326961 A1 | 12/2009 | Petrovic et al. |
| 2010/0034513 A1 | 2/2010 | Nakano et al. |
| 2010/0115267 A1 | 5/2010 | Guo et al. |
| 2010/0121608 A1 | 5/2010 | Tian et al. |
| 2010/0146286 A1 | 6/2010 | Petrovic et al. |
| 2010/0159425 A1* | 6/2010 | Hamlin .......................... 434/169 |
| 2010/0162352 A1 | 6/2010 | Haga et al. |
| 2010/0214307 A1 | 8/2010 | Lee et al. |
| 2010/0226525 A1 | 9/2010 | Levy et al. |
| 2010/0228632 A1 | 9/2010 | Rodriguez |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0016172 A1 | 1/2011 | Shah |
| 2011/0068898 A1 | 3/2011 | Petrovic et al. |
| 2011/0091066 A1 | 4/2011 | Alattar |
| 2011/0103444 A1 | 5/2011 | Baum et al. |
| 2011/0123063 A1 | 5/2011 | Delp et al. |
| 2011/0173210 A1* | 7/2011 | Ahn et al. ..................... 707/748 |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0235908 A1 | 9/2011 | Ke et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2011/0320627 A1* | 12/2011 | Landow et al. ............... 709/231 |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0130719 A1 | 5/2012 | Petrovic et al. |
| 2012/0203556 A1 | 8/2012 | Villette et al. |
| 2012/0265735 A1* | 10/2012 | McMillan et al. ........... 707/687 |
| 2012/0300977 A1 | 11/2012 | Petrovic et al. |
| 2013/0007462 A1 | 1/2013 | Petrovic et al. |
| 2013/0011006 A1 | 1/2013 | Petrovic et al. |
| 2013/0031579 A1 | 1/2013 | Klappert |
| 2013/0073065 A1 | 3/2013 | Chen et al. |
| 2013/0108101 A1 | 5/2013 | Petrovic et al. |
| 2013/0114847 A1 | 5/2013 | Petrovic et al. |
| 2013/0114848 A1 | 5/2013 | Petrovic et al. |
| 2013/0117570 A1 | 5/2013 | Petrovic et al. |
| 2013/0117571 A1 | 5/2013 | Petrovic et al. |
| 2013/0129303 A1* | 5/2013 | Lee et al. ...................... 386/201 |
| 2013/0132727 A1 | 5/2013 | Petrovic |
| 2013/0142382 A1 | 6/2013 | Petrovic et al. |
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0283402 A1 | 10/2013 | Petrovic |
| 2013/0339029 A1 | 12/2013 | Petrovic et al. |

FOREIGN PATENT DOCUMENTS

| | | |
|---|---|---|
| EP | 372601 A1 | 6/1990 |
| EP | 581317 A2 | 2/1994 |
| EP | 2166725 A1 | 3/2010 |
| GB | 2260246 A | 4/1993 |
| GB | 2292506 A | 2/1996 |
| GB | 2363027 A | 12/2001 |
| JP | 10-150548 A | 6/1998 |
| JP | 11-086435 A | 3/1999 |
| JP | 11-284516 A | 10/1999 |
| JP | 11-346302 A | 12/1999 |
| JP | 2000-069273 A | 3/2000 |
| JP | 2000-083159 A | 3/2000 |
| JP | 2000-174628 | 6/2000 |
| JP | 2000163870 A | 6/2000 |
| JP | 2000-216981 | 8/2000 |
| JP | 2001-022366 A | 1/2001 |
| JP | 2001-119555 | 4/2001 |
| JP | 2001-175270 | 6/2001 |
| JP | 2001-188549 | 7/2001 |
| JP | 2001-216763 | 8/2001 |
| JP | 2001-218006 | 8/2001 |
| JP | 2001245132 A | 9/2001 |
| JP | 2001257865 | 9/2001 |
| JP | 2001-312570 | 11/2001 |
| JP | 2001-527660 | 12/2001 |
| JP | 2001339700 | 12/2001 |
| JP | 2002-010057 | 1/2002 |
| JP | 2002-024095 | 1/2002 |
| JP | 2002-027223 A | 1/2002 |
| JP | 2002-091465 A | 3/2002 |
| JP | 2002091712 A | 3/2002 |
| JP | 2002100116 | 4/2002 |
| JP | 2002125205 | 4/2002 |
| JP | 2002-135557 A | 5/2002 |
| JP | 2002-165191 A | 6/2002 |
| JP | 2002176614 A | 6/2002 |
| JP | 2002-519916 A | 7/2002 |
| JP | 2002-232412 A | 8/2002 |
| JP | 2002-232693 A | 8/2002 |
| JP | 2002319924 A | 10/2002 |
| JP | 2002354232 A | 12/2002 |
| JP | 2003-008873 A | 1/2003 |
| JP | 2003-039770 A | 2/2003 |
| JP | 2003-091927 A | 3/2003 |
| JP | 2003-230095 A | 8/2003 |
| JP | 2003-244419 A | 8/2003 |
| JP | 2003-283802 A | 10/2003 |
| JP | 2003316556 A | 11/2003 |
| JP | 2003348324 | 12/2003 |
| JP | 2004-023786 A | 1/2004 |
| JP | 2004070606 A | 3/2004 |
| JP | 2004-163855 A | 6/2004 |
| JP | 2004173237 A | 6/2004 |
| JP | 2004-193843 A | 7/2004 |
| JP | 2004194233 A | 7/2004 |
| JP | 2004-328747 A | 11/2004 |
| JP | 2005051733 A | 2/2005 |
| JP | 2005-094107 A | 4/2005 |
| JP | 2005525600 A | 8/2005 |
| JP | 20080539669 | 11/2008 |
| JP | 20100272920 | 12/2010 |
| JP | 5283732 | 7/2013 |

(56) References Cited

FOREIGN PATENT DOCUMENTS

| | | |
|---|---|---|
| KR | 20100009384 A | 1/2010 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 01-55889 | 8/2001 |
| WO | 0197128 A1 | 12/2001 |
| WO | 2002-23883 A2 | 3/2002 |
| WO | 0249363 A1 | 6/2002 |
| WO | 0295727 A1 | 11/2002 |
| WO | 03052598 A1 | 6/2003 |
| WO | 03102947 | 12/2003 |
| WO | 2005017827 | 2/2005 |
| WO | 2005-027501 | 3/2005 |
| WO | 2006051043 | 5/2006 |
| WO | 2006051043 A1 | 5/2006 |
| WO | 2006116394 | 11/2006 |
| WO | 2006116394 A2 | 11/2006 |
| WO | 2010073236 | 7/2010 |
| WO | 2010073236 A1 | 7/2010 |
| WO | 2013067439 A1 | 5/2013 |
| WO | 2013090462 | 6/2013 |
| WO | 2013090466 | 6/2013 |
| WO | 2013090467 | 6/2013 |

OTHER PUBLICATIONS

"Content Protection—Self Protecting Digital Content," http://www.cryptography.com/technology/spdc/index.html, May 2010 (1 page).

"Microsoft response to CfP for technology solutions to screen digital audio content for LCM acceptance," Microsoft Corporation, May 23, 1999 (9 pages).

"Task AC122—copy protection for distribution services," Http://acad.bg/WISE/english/rd/partners/acts/areal/ac122-t.html, Jul. 1, 1997 (2 pages).

Adelsbach, A., et al., "Proving Ownership of Digital Content," Proc. 3rd Int. Workshop on Information Hiding, 1768:117-133, Sep. 1999.

Aggarwal, A., et al., "Multi-Layer Grid Embeddings," Foundations of Computer Science, 26th Annual Symposium on Foundations of Computer Science, 85:186-196, Oct. 1985.

ARIS Technologies, Inc. "Audio Watermarking System to Screen Digital Audio Content for LCM Acceptance," May 1999 (17 pages).

Barreto, P.S.L.M., et al. "Toward Secure Public-Key Blockwise Fragile Authentication Watermarking," IEEE Proceedings Vision, Image, and Signal Processing, 149(2):57-62, Apr. 2002.

Boney, L., et al., "Digital Watermarks for Audio Signals," Dept. of Electrical Engineering, Univ. of Minnesota, Mar. 1996 (4 pages).

Cappellini, V., et al. "Robust Frame-based Watermarking for Digital Video," Proceedings of the 12th International Workshop on Database and Expert Systems Applications, Sep. 2001 (5 pages).

Caronni, G., "Assuring Ownership Rights for Digital Images," Proceedings of reliable IT systems VIS 95, Vieweg Publishing Company, Germany, 1995 (10 pages).

Chen, B., et al., "Quantization index modulation: a class of provably good methods for digital watermarking and information embedding," IEEE Transactions on Information Theory, 47(4):1423-1443 May 2001.

Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).

Chou, J., et al., "A Robust Optimization Solution to the Data Hiding Problem using Distributed Source Coding Principles," Pro. SPIE, 3971, San Jose, California, Jan. 2000 (10 pages).

Cinea, Inc., "Forensic watermarking deterring video piracy," 2004, (9 pages). [http://www.cinea.com/whitepapers/forensic_watermarking.pdf].

Costa, M., "Writing on Dirty Paper," IEEE Trans. on Info. Theory, 29(3):439-441, May 1983.

Cox, I. J., et al., "Some general methods for tampering with watermarks," IEEE Journal on Selected Areas in Communications, 16(4): 587-593, May 1998.

Coxford, A., et al., "Advanced Mathematics: A Preparation for Calculus, Second Edition," Harcourt Brace Jovanovish, Inc., 1978 (14 pages).

Das, et al., "Distributed Priority Queues on Hybercube Architectures," IEEE, 1996, pp. 620-627.

Davidson, M.F., "Music File Filter," Sony Music, New York, May 23, 1999 (2 pages).

Digimarc Corporation, "Digimarc Watermarking Guide," 1999 (22 pages).

Dittmann, J., "Combining digital watermarks and collusion secure fingerprints for customer copy monitoring," Proc. IEEE Seminar on Secure Images and Image Authentication, Apr. 2000 (6 pages).

Dittmann, J., et al., "Combining digital watermarks and collusion secure fingerprints for digital images," Proc. SPIE 3657:171-182, Jan. 1999 (12 pages).

Epp, L.W., et al., "Generalized scattering matrices for unit cell characterization of grid amplifiers and device de-embedding," IEEE, 2:1288-1291, Jun. 1995.

European Search Report dated Apr. 12, 2012 for European Patent Application No. 07836262.1 filed Jul. 25, 2007 (12 pages).

European Search Report dated Nov. 10, 2010 for European Patent Application No. 03774648.4, filed Oct. 7, 2003 (5 pages).

European Search Report dated Jul. 3, 2012 for European Patent Application No. 12150742.0, filed Oct. 7, 2003 (5 pages).

Furon, T., et al., "An asymmetric watermarking method," IEEE Trans. Signal Processing, 4(51):981-995, Apr. 2003.

Guth, H. J. et al., "Error-and collusion-secure fingerprinting for digital data," Proc. 3rd Int. Workshop on Information Hiding, LNCS 1768:134-145, Sep./Oct. 1999.

Hartung, F., et al., "Digital watermarking of MPEG-2 coded video in the bitstream domain," Proc. IEEE Int. Conf. on Acoustics, Speech and Signal Processing, 4:2621-2624, Apr. 1997.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Heegard, C., et al., "On the capacity of computer memory with defects," IEEE Trans. Info. Theory, 5(IT-29):731-739, Sep. 1983.

International Search Report and Written Opinion dated Apr. 24, 2012 for International Application No. PCT/US2011/051857, filed Sep. 15, 2011 (9 pages).

International Search Report and Written Opinion dated Aug. 14, 1998 for International Application No. PCT/US1998/009587, filed May 12, 1998 (3 pages).

International Search Report and Written Opinion dated Aug. 22, 2007 for International Application No. PCT/US2006/031267, filed Aug. 9, 2006 (2 pages).

International Search Report and Written Opinion dated Feb. 14, 2002 for International Application No. PCT/US2001/026505, filed Aug. 27, 2001 (2 pages).

International Search Report and Written Opinion dated Jan. 4, 2008 for International Application No. PCT/US2006/015615, filed Apr. 25, 2006 (5 pages).

International Search Report and Written Opinion dated Mar. 28, 2012 for International Application No. PCT/US2011/051855, filed Sep. 15, 2011 (8 pages).

International Search Report and Written Opinion dated May 13, 2008 for International Application No. PCT/US2006/025090, filed Jun. 27, 2006 (2 pages).

International Search Report and Written Opinion dated May 19, 2004 for International Application No. PCT/US2003/031816, filed Apr. 29, 2004 (3 pages).

(56) References Cited

OTHER PUBLICATIONS

International Search Report and Written Opinion dated May 29, 2008 for International Application No. PCT/US2006/015410, filed Apr. 21, 2006 (6 pages).
International Search Report and Written Opinion dated Sep. 26, 2008 for International Application No. PCT/US2007/016812, filed Jul. 25, 2007 (6 pages).
Jacobsmeyer, J., et al., "Introduction to error-control coding," Pericle Communications Company, 2004 (16 pages).
Kalker, T., et al., "A security risk for publicly available watermark detectors," Proc. Benelux Info. Theory Symp., Veldhoven, The Netherlands, May 1998 (7 pages).
Kalker, T., et al., "System issues in digital image and video watermarking for copy protection," Proc. IEEE Int. Conf. on Multimedia Computing and Systems, pp. 562-567, Jun. 1999.
Kang, X., et al., "A DWT-DFT composite watermarking scheme robust to both affine transform and JPEG compression," IEEE Transactions on Circuits and Systems for Video Technology, 8(13):776-786 Aug. 2003.
Kim, T.Y., et al., "An asymmetric watermarking system with many embedding watermarks corresponding to one detection watermark," IEEE Signal Processing Letters, 3(11 ):375-377, Mar. 2004.
Kirovski, D., et al., "Multimedia content screening using a dual watermarking and fingerprinting system," Proceedings of the tenth ACM international conference, pp. 372-381, 2002.
Kirovski, D., et al., "Randomizing the replacement attack," ICASSP, pp. 381-384, 2004.
Bangaleea, R., et al., "Performance improvement of spread spectrum spatial-domain watermarking scheme through diversity and attack characterisation," IEEE Africon, pp. 293-298, 2002.
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
European Search Report dated Nov. 8, 2012 for European Patent Application No. 06785709.4, filed Jun. 27, 2006 (5 pages).
International Search Report and Written Opinion dated Apr. 8, 2013 for International Application No. PCT/US2012/069306, filed Dec. 12, 2012 (12 pages).
International Search Report and Written Opinion dated Mar. 25, 2013 for International Application No. PCT/US2012/069302, filed Dec. 12, 2012 (22 pages).
International Search Report and Written Opinion dated Feb. 28, 2013 for International Application No. PCT/US2012/066138, filed Nov. 20, 2012 (11 pages).
International Search Report and Written Opinion dated Mar. 14, 2013 for International Application No. PCT/US2012/069308, filed Dec. 12, 2012 (10 pages).
International Search Report and Written Opinion dated Mar. 18, 2013 for International Application No. PCT/US2012/063431, filed Nov. 2, 2012 (10 pages).
Kirovski, D., et al., "Robust spread-spectrum audio watermarking," IEEE International Conference on Acoustics, Speech, and Signal Processing, 3:1345-1348, 2001.
Office Action dated Nov. 26, 2012 for Japanese Patent Application No. 2011-114667 (8 pages).
Office Action dated Nov. 28, 2012 for Japanese Patent Application No. 2011-114666 (8 pages).
Seok, J., et al., "A novel audio watermarking algorithm for copyright protection of digital audio," ETRI Journal, 24(3):181-189, Jun. 2002.
Wolfgang, R., et al., "Perceptual watermarks for digital images and video," Proceedings of the IEEE, 87 (7):1108-1126, Jul. 1999.
Kirovski, D., et al., "Multimedia content screening using a dual watermarking and fingerprinting system," Multimedia '02 Proceedings of the tenth ACM international conference on Multimedia, 2002 (11 pages).
Kocher, P., et al., "Self-Protecting Digital Content: A Technical Report from the CRI Content Security Research Initiative," Cryptography Research, Inc. (CRI), 2002-2003 (14 pages).
Kutter, M., et al., "The watermark copy attack," Proc. of the SPIE: Security and Watermarking of Multimedia Content II, 3971:1-10, Jan. 2000.
Kuznetsov, a.V., et al., "An error correcting scheme for defective memory," IEEE Trans. Inf. Theory, 6(4):712-718, Nov. 1978 (7 pages).
Lacy, J., et al., "Intellectual property protection systems and digital watermarking," Proceedings: Information Hiding, Second International Workshop, Portland, Oregon, pp. 158-168, 1998.
Lin, E.T., et al., "Detection of image alterations using semi-fragile watermarks," Proceedings of the SPIE International Conference on Security and Watermarking of Multimedia Contents II, Janaury 2000 (12 pages).
Lin, P.L., et al., "Robust transparent image watermarking system with spatial mechanisms," The Journal of Systems and Software, 50:107-116, Feb. 2000.
Lotspeich, J., "The Advanced Access Content System's Use of Digital Watermarking," MCPS '06, Oct. 28, 2006, pp. 19-21.
Lu, C.S., et al., "Oblivious cocktail watermarking by sparse code shrinkage: A regional-and global-based scheme," IEEE Transactions on Multimedia, 4(2):209-224, Dec. 2000.
Maehara, F., et al., "A proposal of multimedial home education terminal system based on flash-squeak OS," Technical report of the institute of image information and television engineers, 28(43):21-24, Jul. 2004.
Mason, A. J., et al., "User requirements for watermarking in broadcast applications," IEEE Conference Publication, International Broadcasting Convention (BC 2000), Amsterdam, Sep. 8-12, 2000 (7 pages).
Mintzer, F., et al., "If one watermark is good, are more better?," Acoustics, Speech, and Signal Processing, ICASSP, 4:2067-2069, Mar. 1999.
Mobasseri, B.G., et al. "Content authentication and tamper detection in digital video," Image Processing Proceedings, International Conference, 1:458-461, 2000.
Moulin, P., et al., "Detection-theoretic analysis of desynchronization attacks in watermarking, " Technical Report MSR-TR-2002-24, Microsoft Corporation, Mar. 2002.
Muranoi, R., et al., "Video retrieval method using shotID for copyright protection systems," Proc. SPIE Multimedia Storage and Archiving Systems III, 3527:245-252, Nov. 1998.
Nikolaidis, N., et al., "Watermark detection: benchmarking perspectives," 2002 IEEE Conference on Multimedia and Expo, 2002 (4 pages).
Office Action dated Mar. 16, 2012 for Japanese Patent Application No. 2008-508985 (8 pages).
Office Action dated Jul. 21, 2011 for Japanese Patent Application No. 2008-508985 (6 pages).
Office Action dated Mar. 18, 2011 for European Patent Application No. 03774648.4 (6 pages).
Office Action dated May 8, 2012 for Japanese Patent Application No. 2009-522802 (4 pages).
Park, J.H., et al., "Robust and fragile watermarking techniques for documents using bidirectional diagonal profiles," Information and Communications Security: Third International Conference, Xian, China, Nov. 2001, pp. 483-494.
Perez-Gonzalez, F., et al., "Approaching the capacity limit in image watermarking a perspective on coding techniques for data hiding applications," Signal Processing, 6(81):1215-1238 Jun. 2001.
Petitcolas, F., et al., "The blind pattern matching attack on watermark systems," IEEE Trans. Signal Processing, Apr. 2003 (4 pages).
Petitcolas, F.A.P., et al., "Attacks on copyright marking systems," Second Workshop on Information Hiding, Lecture Notes in Computer Science, Portland, Oregon, pp. 218-238, Apr. 1998.
Philips Research Liquid Audio Fraunhofer Institute, "Digital Audio Screening Technology for Phased Rollout," Version 1.00, May 1999 (38 pages).
Pytlak, J.,"Anti-piracy coding," URL: http://www.tele.com/pipermail/tig/2003-November/003842.html; Nov. 2003 (2 pages).
RSA Laboratories, "Frequently asked questions about today's cryptography," Version 4.1, May 2000 (37 pages).
Schneier, B., "Applied cryptography, second edition: protocols, algorithms and source code in C," Oct. 1995 (10 pages).

(56) References Cited

OTHER PUBLICATIONS

Shih, F.Y., et al., "Combinational, image watermarking in the spatial and frequency domains," Pattern Recognition, 36:696-975, May 2002.

Solanki, K., et al., "Robust image-adaptive data hiding: modeling, source coding and channel coding", 41st Allerton Conference on Communications, Control and Computing, Oct. 2003 (10 pages).

Steinebach, M., et al., "StirMark benchmark: audio watermarking attacks," International Conference on Information Technology: Coding and Computing (ITCC 2001), Las Vegas, Nevada, Apr. 2001 (6 pages).

Tanaka, K., et al., "Secret transmission method of character data in motion picture communication," SPIE Visual Communications and Image Processing '91, 1605:646-649, 1991.

Tsai, M.J., et al., "Wavelet packet and adaptive spatial transformation of watermark for digital image authentication," IEEE Image Processing, 2000 International Conference, 1:450-453, 2000 (4 pages).

Verance Corporation, "Confirmedia," PowerPoint presentation made to National Association of Broadcasters; Apr. 24, 2001 (40 pages).

Xu, C., et al., "Applications of digital watermarking technology in audio signals," Journal of Audio Eng. Soc., 10 (47):805-812, Oct. 1999.

Yeung, M. M., et al., "An invisible watermarking technique for image verification," Image Processing, International Conference Proceedings, 2:680-683, Oct. 26-29, 1997.

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

"Civolution's 2nd screen synchronisation solution wins CSI product of the year 2011 award at IBC," IBC Press Release, Hall 2—Stand C30, Sep. 2011 (2 pages).

"Red Bee and Civolution develop companion app for FX UK," http://digitaltveurope.net/19981/red-bee-and-civolution-develop-companion-app-for-fx-uk, Jan. 2012 (2 pages).

Office Action dated May 1, 2013 for Japanese Patent Application No. 2011-114667 (6 pages).

Spangler, T., "Social Science," http://www.multichannel.com/content/social-science, Sep. 2011 (5 pages).

Wang, X, et al., "Robust correlation of encrypted attack traffic through stepping stones by manipulation of interpacket delays," Proceedings of the 10th ACM conference on computer communications security, Oct. 27-30, 2003, Washington D.C., USA.

\* cited by examiner

SECOND SCREEN CONTENT

FIELD OF INVENTION

The present application generally relates to the field of multimedia content processing and presentation, and in particular, to enhancing the use of multimedia content.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content.

A multimedia content, such as an audiovisual content, often consists of a series of related images which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc. In some scenarios, such a multimedia content, or portions thereof, may contain only one type of content, including, but not limited to, a still image, a video sequence and an audio clip, while in other scenarios, the multimedia content, or portions thereof, may contain two or more types of content.

SUMMARY

The disclosed embodiments relate to methods, systems, devices and computer program products that facilitate consumption of, and interaction with, multimedia content by providing automatic or user-selectable enhanced multimedia perception capabilities. These capabilities allow full comprehension (or substantially full comprehension) of the content, whereas without those capabilities such content may become substantially unusable or unfit for presentation to a user or a group of users.

One aspect of the disclosed embodiments relates to a method that includes detecting, at a second device, an identification information that is embodied in a first content from at least one segment of the first content, where the detecting is carried out while the first content is being presented by a first device. The detecting of identification information comprises processing the at least one segment using a processor to obtain the identification information. This method further includes, in response to the detection of the identification information, triggering presentation of a second content on the second device, where the second content is necessary for substantially full comprehension of one or more portions of the first content. In one embodiment, the identification information is detected from one or more watermarks that are embedded in the at least one segment of the first content. In a particular embodiment, the one or more watermarks include a timecode.

According to another embodiment, the identification information is detected by computing one or more fingerprints from the at least one segment of the first content, where the one or more fingerprints represent an inherent characteristic of the at least one segment of the first content. In one embodiment, the identification information identifies at least one of: the first content, and the at least one segment of the first content. In another embodiment, the second content facilitates accessibility of the first content to people with disabilities or special needs. In still another embodiment, the second content is presented using a haptic interface. In another embodiment, the second content is presented in a different audio-visual modality than the first content.

In one embodiment, the second content is selected from a group of contents consisting of: a closed caption content, an audio content designed for consumption of hearing impaired persons, a video content designed for consumption of visually impaired persons, a content presented in Braille, an audio content that includes a modified dialog portion, a dialog-only audio content, an audio description, a video content with enhanced contrast, and a video content with enhanced details. In another embodiment, the second content comprises a speech portion that provides a different level of vocabulary than the corresponding speech portion associated with the first content being presented by the first device. In one variation, the different level of vocabulary is adjustable so as to enable an increase or decrease of difficulty associated with the vocabulary level.

According to another embodiment, the second content comprises a speech portion that is presented in a different language than a corresponding speech portion of the first content as being presented by the first device. In one embodiment, the above noted method further comprises, in response to the detection of the identification information, muting an audio portion of the first content on the first device. In yet another embodiment, the second content provides a particular level of parental control. In still another embodiment, the second content is presented in accordance with preferences associated with the second device.

In another embodiment, the second content enables comprehension of a cultural reference presented as part of the first content. In one embodiment, the second content includes an explanation to clarify one of: a particular dialect, a historical reference, and a geographical reference. In another embodiment, the second content corresponds to an encyclopedia entry or a dictionary entry. In one embodiment, the second content is presented in synchronization with the first content, while in another embodiment, presentation of the second content comprises presenting a plurality of choices for presentation of the second content, receiving a response indicative of selection of a specific choice from the plurality of choices, and retrieving the second content based on the response. In one embodiment, receiving the response comprises receiving the response through one or more of: a voice command, a blow tube, a brainwave transmission device, and an eye movement detection device.

The operations of the above described method can be performed by the second device alone or in collaboration with the first device. According to another embodiment, where the at least one segment of the first content is received at the second device, detecting the identification information is carried out by the second device, and the second content is retrieved by the second device from a secondary content database. In one embodiment, detecting the identification information is carried out by the first device, and prior to triggering presentation of the second content, the detected identification information is communicated by the first device to the second device; and the second content is retrieved by the second device from a database. In another embodiment, detecting the identification information is carried out by the first device, the second content is retrieved by the first device from a database, and prior to triggering presentation of the second content, the retrieved second content is communicated by the first device to the second device.

Another aspect of the disclosed embodiments relates to a method that comprises detecting, at a second device, an identification information that is embodied in a first content from at least one segment of the first content, where the detecting is carried out while the first content is being presented by a first device, and where the detecting comprises processing the at least one segment using a processor to obtain the identification information. This method also includes, in response to the detection of the identification information, triggering presentation of a second content on the second device, where the second content accommodates a physical characteristic of a particular user of the second content. In one embodiment, the physical characteristic is the chronological age of a particular user. For example, the second content is a content that is appropriate for chronological age of the particular user. In another embodiment, the physical characteristic of a particular user of the second content is a disability or special need of the particular user.

Another aspect of the disclosed embodiments relates to a device that includes a processor, and a memory comprising processor executable code. The processor executable code, when executed by the processor, configures the device to detect an identification information from at least one segment of a first content while the first content is being presented by another device, and, in response to the detection of the identification information, to trigger presentation of a second content by the device, where the second content accommodates a physical characteristic of a particular user of the second content.

Another aspect of the disclosed embodiments relates to a device that includes a processor, and a memory comprising processor executable code. The processor executable code, when executed by the processor, configures the device to detect an identification information from at least one segment of a first content while the first content is being presented by another device, and, in response to the detection of the identification information, to trigger presentation of a second content by the device, where the second content accommodates a physical characteristic of a particular user of the second content.

Another aspect of the disclosed embodiments relates to a device that includes a processor, and a memory comprising processor executable code. The processor executable code, when executed by the processor, configures the device to detect an identification information from at least one segment of a first content while the first content is being presented by another device, and, in response to the detection of the identification information, to trigger presentation of a second content by the device, where the second content is necessary for substantially full comprehension of one or more portions of the first content.

Another aspect of the disclosed embodiments relates to a computer program product, embodied on a non-transitory computer readable medium, that includes program code for detecting, at a second device, an identification information that is embodied in a first content from at least one segment of the first content, where the detecting is carried out while the a content is being presented by a first device, and where the detecting comprises processing the at least one segment using a processor to obtain the identification information. The computer program product also includes program code for, in response to the detection of the identification information, triggering presentation of a second content by the second device, where the second content is necessary for substantially full comprehension of one or more portions of the first content.

Another aspect of the disclosed embodiments relates to a device that comprises an identification code detector configured to detect an identification information from at least one segment of a first content while the first content is being presented by another device. The device also includes a trigger component configured to, in response to the detection of the identification information, trigger presentation of a second content by the device, where the second content is necessary for substantially full comprehension of one or more portions of the first content.

In one embodiment, the identification code detector is configured to extract one or more watermarks that are embedded in the at least one segment of the first content. In another embodiment, the identification code detector is configured to compute one or more fingerprints from the at least one segment of the first content, where the one or more fingerprints represent an inherent characteristic of the at least one segment of the first content. In one embodiment, the second content facilitates accessibility of the first content to people with disabilities or special needs. In another embodiment, the device further includes a haptic interface configured to present the second content.

According to another embodiment, the device also includes a user interface configured to present the second content selected from a group of contents consisting of: a closed caption content, an audio content designed for consumption of hearing impaired persons, a video content designed for consumption of visually impaired persons, a Braille content, an audio content that includes a modified dialog portion, a dialog-only audio content, an audio description, a video content with enhanced contrast, and a video content with enhanced details. In another embodiment, the device includes a user interface configured to present the second content comprising a speech portion that provides a different level of vocabulary than the corresponding speech portion associated with the first content being presented by the first device. In one embodiment, the different level of vocabulary is adjustable so as to enable an increase or decrease of difficulty associated with the vocabulary level.

In another embodiment, the device also includes a user interface configured to present the second content comprising a speech portion that is presented in a different language than a corresponding speech portion of the first content as being presented by the first device. In one embodiment, the device is further configured to, in response to the detection of the identification information, mute an audio portion of the first content on the first device. In yet another embodiment, the device includes a user interface configured to present the second content to enable comprehension of a cultural reference presented as part of the first content. In still another embodiment, the device includes a user interface that is configured to present the second content that corresponds to an encyclopedia entry or a dictionary entry.

According to another embodiment, the device is also configured to present the second content in synchronization with the first content. In another embodiment, the device is configured to present a plurality of choices for presentation of the second content, receive a response indicative of selection of a specific choice from the plurality of choices, and retrieve the second content based on the response. In one embodiment, the device is configured to receive the response that provided through one or more of: a voice command, a blow tube, a brainwave transmission device, and an eye movement detection device. In yet another embodiment, the device further comprises a communication unit configured to communicate with a secondary content database to retrieve the second content.

Another aspect of the disclosed embodiments relates to a device that includes an identification code detector configured to detect an identification information from at least one segment of a first content while the first content is being presented by another device. The device also includes a trigger component configured to, in response to the detection of the identification information, trigger presentation of a second content by the device, wherein the second content accommodates a physical characteristic of a particular user of the second content.

DETAILED DESCRIPTION OF CERTAIN EMBODIMENTS

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

Figure 1:
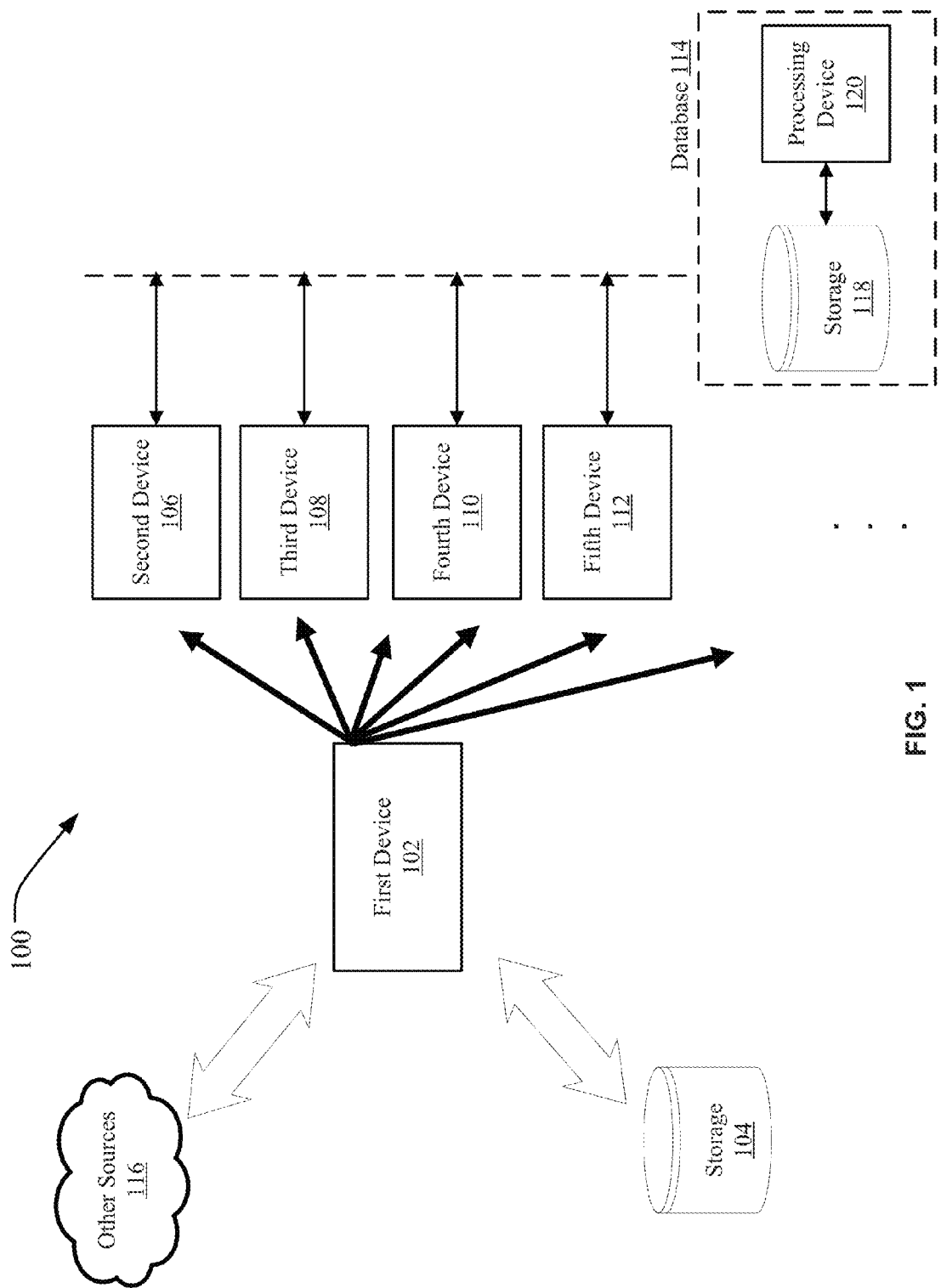
FIG. 1 illustrates a system that can accommodate certain disclosed embodiments.

FIG. 1 illustrates a system 100 that can accommodate the disclosed embodiments. The system 100 includes a first device 102 that is configured to present a multimedia content. The content can be an entertainment content, such as a movie or a TV show, a live broadcast, and the like. The first device 102 can be coupled to, or include, a display screen, a projector screen, one or more speakers and the associated circuitry and/or software components to enable the reception, processing and presentation of a multimedia content. The first device 102 may also be in communication with a storage 104 unit. The storage 104 unit can be any one of, or a combination of, a local and a remote (e.g., cloud-based) storage device. The storage 104 unit can store a variety of multimedia content, meta data, applications, instructions, etc., which may be stored on magnetic, optical, semiconductor and/or other types of memory devices. The first device 102 may, alternatively or additionally, be configured to receive multimedia content and metadata through one or more other sources 116, such as through the Internet, through a terrestrial broadcast channel, through a cable network, through a home network (e.g., a Digital Living Network Alliance (DLNA) compliant network), through a wired or wireless network (e.g., a local area network (LAN), wireless LAN (WLAN), a wide area network (WAN) and the like). Such a media content can also be a real-time (e.g., streaming) content that is broadcast, unicast or otherwise provided to the first device 102. The received content can be at least partially stored and/or buffered before being presented by the first device 102.

Referring again to FIG. 1, at least a portion of the first (or primary) media content that is presented by the first device 102 is received by at least one device, such as the second device 106. At least a portion of the first media content that is presented by the first device 102 may be received by devices other than the second device 106 (if present), such as the third device 108, fourth device 110, fifth device 112, etc. The terms "secondary device" or "secondary devices" are sometimes used to refer to one or more of the second device 106, third device 108, fourth device 110, fifth device 112, etc. In some embodiments, additional systems similar to the system 100 of FIG. 1 can simultaneously access and present the same content. For example, the system 100 of FIG. 1 can reside at a first household while a similar system can reside at a second household, both accessing the same content (or a different contents) and presenting them to a plurality of devices or users of the devices.

One or more of the second 106, the third 108, the fourth 110, the fifth 112, etc., devices can be in communication with a database 114. The database 114 includes one or more storage 118 devices for storage of a variety of multimedia content, meta data, survey results, applications, instructions, etc., which may be stored on magnetic, optical, semiconductor and/or other types of memory devices. The content this is stored at database 114 can include one or more versions of a second content that is tailored to accommodate needs of users of the secondary devices 106, 108, 110 and 112 to allow full comprehension of the first content as is being presented by the first device 102. Such second content is sometimes referred to as the "second screen content." It is, however, understood that such a content can be in one or more of a variety of content formats, such as in an audio format, video format, text, Braille content, and the like. The database 114 can include a remote (e.g., cloud-based) storage device. The database 114 can further include, or be in communication with, one or more processing devices 120, such as a computer, that is capable of receiving and/or retrieving information, data and commands, processing the information, data, commands and/or other information, and providing a variety of information, data, commands. In some embodiments, the one or more processing devices 120 are in communication with the one or more of the secondary devices and can, for example, send/receive data, information and commands to/from the secondary devices.

In one specific example, the first device 102 is a television set that is configured to present a video content and an associated audio content, and at least one of the secondary devices is a portable media device (e.g., a smart phone, a tablet computer, a laptop, etc.) that is equipped to receive the audio portions of the presented content through a an interface, such as a microphone input. In this specific example, each of the secondary devices can be further configured to process the captured audio content, process the audio content to detect particular information, such as an identification information, synchronization and timing information, and the like, and to further present a second content to the user to allow full comprehension of the first content. In another example, the first device 102 can be any audio-visual presentation device that, for example, includes a display. In other exemplary scenarios, one or more of the secondary devices are configured to receive at least a segment of the content presented by the first device 102: (a) by capturing a portion of the presented video, (b) through wireless transmissions (e.g., 802.11 protocol, Infrared transmissions, etc.) from the first device 102, and/or (c) through wired transmissions that are provided by the first device 102. These various transmission channels and mechanisms for conveying one or more segments of the content (or information such as time codes associated with the content) to the secondary devices are shown in FIG. 1 as arrows that originate from the first device 102 in the direction of the second 106, the third 108, the fourth 110, the fifth 112, etc., devices.

Figure 2:
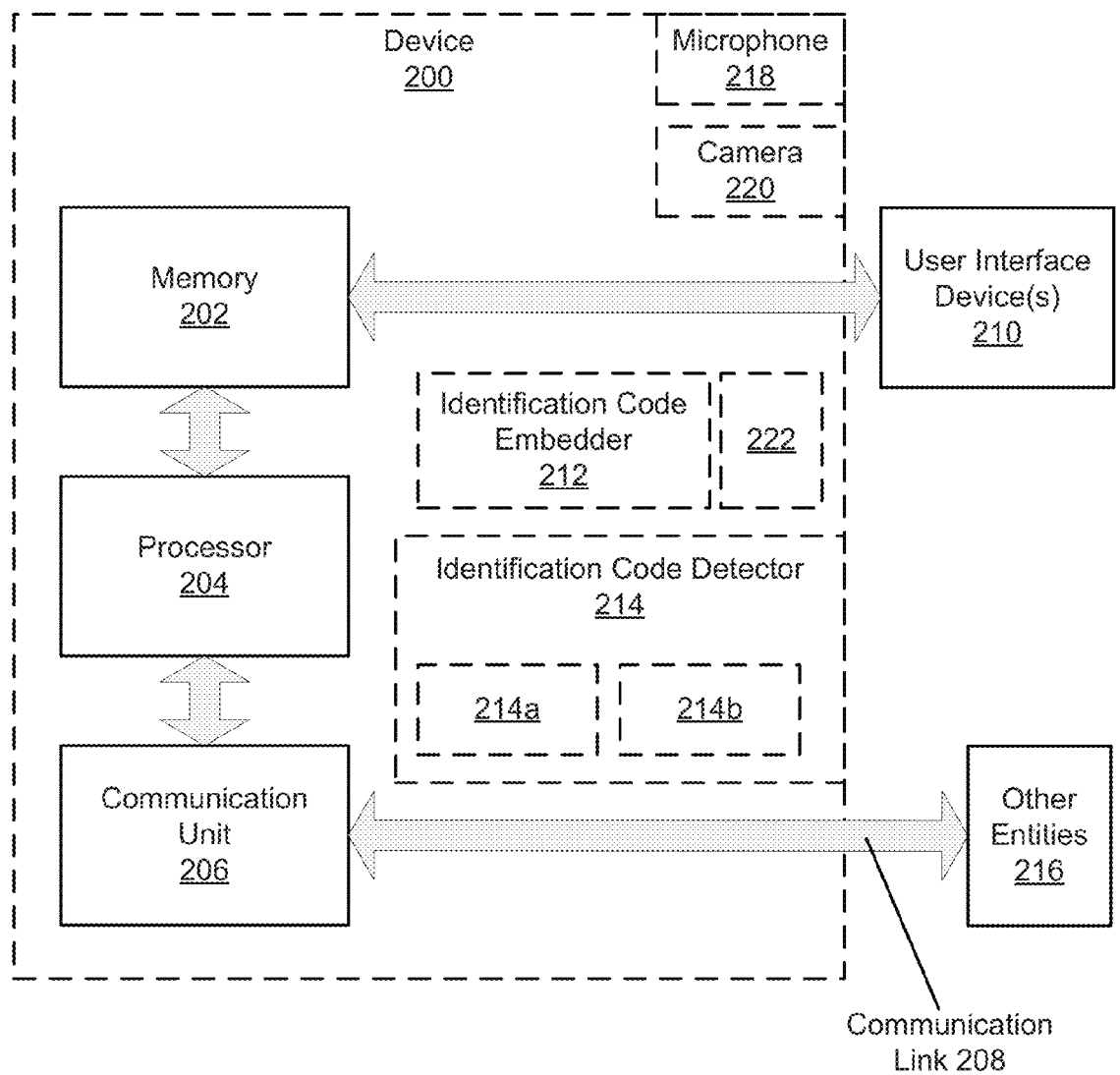
FIG. 2 illustrates a block diagram of a device within which certain disclosed embodiments may be implemented.

FIG. 2 illustrates a block diagram of a device 200 within which certain disclosed embodiments may be implemented. The exemplary device 200 that is depicted in FIG. 2 may be integrated into as part of the first device 102 and/or the second 106, the third 108, the fourth 110 and the fifth 112 devices that are illustrated in FIG. 1. The device 200 comprises at least one processor 204 and/or controller, at least one memory 202 unit that is in communication with the processor 204, and at least one communication unit 206 that enables the exchange of data and information, directly or indirectly, through the communication link 208 with other entities, devices, databases and networks (collectively illustrated in FIG. 2 as Other Entities 216). The communication unit 206 may provide wired and/or wireless communication capabilities in accordance with one or more communication protocols and, therefore, it may comprise the proper transmitter/receiver antennas, circuitry and ports, as well as the encoding/decoding capabilities that may be necessary for proper transmission and/or reception of data and other information. In some embodiments, the device 200 can also include a microphone 218 that is configured to receive an input audio signal. In some embodiments, the device 200 can also include a camera 220 that is configured to receive a video and/or still image signal. The received audio, video and/or still image signals can be processed (e.g., converted from analog to digital, color correction, sub-sampled, evaluated to detect embedded watermarks, analyzed to obtain fingerprints etc.) under the control of the processor 204. In some embodiments, instead of, or in addition to, a built-in microphone 218 and camera 220, the device 200 may be equipped with an input audio port and an input/output video port that can be interfaced with an external microphone and camera, respectively.

The device 200 may also be coupled to one or more user interface devices 210, including but not limited to a display device, a keyboard, a speaker, a mouse, a touch pad, a Braille reader and/or a haptic interface. The haptic interface, for example, can provide a tactile feedback that takes advantage of the sense of touch by applying forces, vibrations, or motions to a user. While in the exemplary block diagram of FIG. 2 the user interface devices 210 are depicted as residing outside of the device 200, it is understood that, in some embodiments, one or more of the user interface devices 210 may be implemented as part of the device 200. In some embodiments, the device 200 can also include an identification code embedder 212 and/or an identification code detector 214 that are configured to embed an identification codes into a media content and extract an identification code from a media content, respectively. In some embodiments, the identification code detector 214 can include one or both of a watermark extractor 214a and a fingerprint computation component 214b. The use of identification codes are described in more detail in sections that follow.

Multimedia content can be identified using a variety of techniques. For example, a portion of the multimedia file (e.g., a file header) can be used to carry identification information such as the name and the size of the multimedia content, the date at which the content was produced or edited, the owner of the content and the like. While such identification techniques may be useful in some applications, they requires the presence of additional data that must be interleaved or appended to a multimedia content, which occupies additional bandwidth and, more importantly, can be lost when content is transformed into a different format (such as digital to analog conversion, transcoded into a different file format, etc.). Watermarking and fingerprinting techniques can also be used to additionally or alternatively identify a content. Using watermarking techniques, an imperceptible auxiliary signal is embedded into the multimedia content that can carry identification information associated with the content. In fingerprinting techniques, inherent features of the content are analyzed (as opposed to the insertion of a foreign signal that is done in watermarking techniques) to produce a mathematical signature or fingerprint from those inherent features that uniquely identify the content.

In some exemplary embodiments, the content (i.e., the primary media content or the first content) that is presented by the first device 102 is encoded with auxiliary information that allows identification of the presented content. For example, the auxiliary information can be substantially imperceptibly embedded into a component of the first content (e.g., in the audio track and/or video frames of the content) using any one of the watermark embedding techniques that is known in the art. The embedded watermarks are typically not perceivable by humans but can be detected by a watermark extractor that is implemented as part of a watermark detection device. In the exemplary scenario where the audio track of a movie is embedded with watermarks, a user device (e.g., the second 106, the third 108, the fourth 110 and/or the fifth 112 devices that are illustrated in FIG. 1) includes a watermark extractor 214a (e.g., implemented as a component within the identification code detector 214 of FIG. 2). In this exemplary scenario, at least a portion of the audio track of the primary content is captured by a user device (e.g., by the second device 106 through a microphone 218) and processed to determine if it includes embedded auxiliary information. Upon detection of the auxiliary information that represents information identifying the content, the user device is configured to present a second content that is necessary for substantially full comprehension of the primary media content. Such a second content can be presented in synchronization with the primary content. FIG. 2 also shows a trigger component 222 that is configured to trigger the presentation of the second content upon identification of the first content. For example, the trigger component 222 can trigger the presentation of an audio track at a higher than normal volume.

It should be noted that while various components within the device 200 of FIG. 2 are shown as separate components, some of these components may be integrated or implemented within other components of device 200. For example, the trigger component 222 can be integrated into the identification code detector 212, or implemented as code that is executed by the processor 204. It should be further noted that, while not explicitly shown to avoid clutter, various components of the device 200 in FIG. 2 are in communication with other components of the device 200.

In some of the disclosed embodiments, the second content facilitates accessibility of the primary content to people with disabilities or special needs. For example, for a hearing impaired person, the detection of identification information can trigger an alternate sound track that is specifically designed for hearing impaired persons, and/or trigger a closed caption text screen on the user device. In some examples, such a specifically designed sound track can include one or more sections (e.g., dialog sections) with a higher volume than a normal audio content, a frequency-adjusted audio content that is tailored to compensate for deficiencies in an individual's auditory system, a dialog-only audio portion, and/or an audio description, which can include a narrator describing the scenes of the first content, including what transpires during silent or non-dialog portions of the first content. In another example, the detection of identification information can trigger the presentation of a content on the user device that is specially tailored for visually impaired persons. Such a content can, for example, include an enhanced contrast or display certain objects enhanced detail (e.g., display at least some portions of the video at a higher magnification). Additionally or alternatively, the second content can be presented on a Braille interface or on a haptic interface. This way, the primary content can be followed along by person with special needs. Without presentation of such secondary content, people with such disabilities or special needs cannot fully comprehend the primary content that is presented by the first device. The disclosed embodiments avoids having secondary content interfere with viewing or listening experiences of other audience members, if present.

Figure 3:
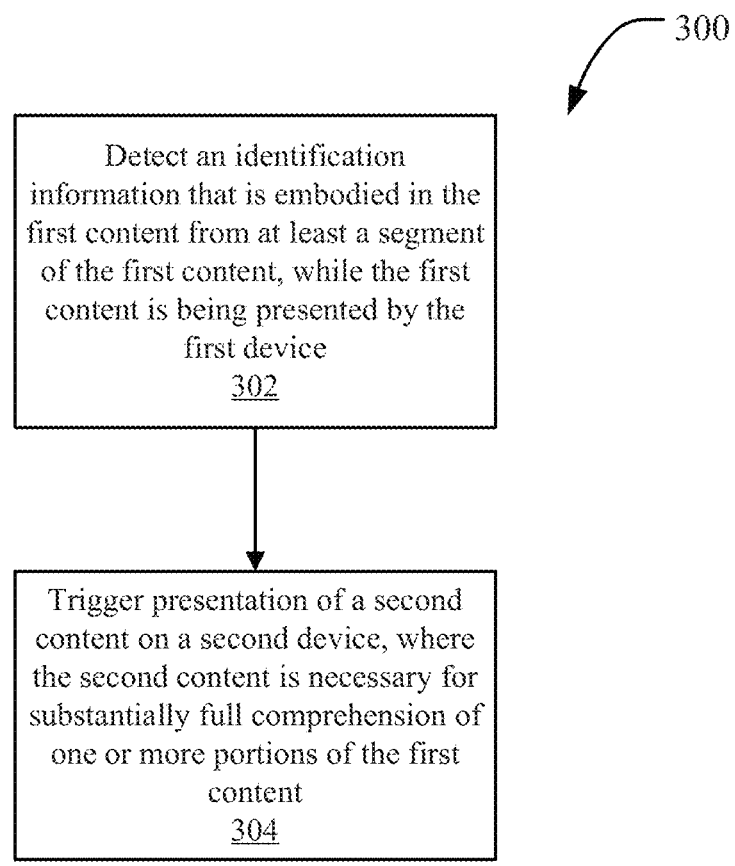
FIG. 3 illustrates a set of operations that can be carried out in accordance with an exemplary embodiment.

FIG. 3 illustrates a set of operations 300 that can be carried out in accordance with an exemplary embodiment. At 302, an identification code that is embodied in a first content is detected from at least a segment of the first content. The detection of identification information is carried out while the first content is being presented by a first device. The detection of the identification information can be done by processing the at least one segment with a processor to obtain the identification information. For example, such processing can include, but is not limited to, one or more of analog to digital conversion, filtering, noise removal, watermark extraction, fingerprint computation, that are carried out by a digital and/or analog signal processing circuitry, a microprocessor and the like. At 304, in response to the detection of the identification information, presentation of a second content on a second device is triggered, where the second content is necessary for substantially full comprehension of one or more portions of the first content. Without presentation of the second content, a segment of population would be unable to fully comprehend the first content as is presented by the first device. In some scenarios, such secondary content may serve only a small segment of the population and thus the production and dissemination of the necessary secondary content by the content producers may not be economically feasible to address the needs of a relatively small number of users. By providing the necessary secondary content in accordance with the disclosed embodiments, the need to include different types and formats of the secondary content with the first content is eliminated, thereby reducing processing, storage and transmission costs associated with the first content. In another exemplary scenario, in addition to, or instead of the operations at 304, in response to the detection of the identification information, presentation of a second content on a second device is triggered, where the second content accommodates a physical characteristic of a particular user of the second content. For example, the second content is tailored to cater to personal needs of a user or a group of users of the content, such as to accommodate their physical disability or special needs. In some embodiments, such a physical characteristic is chronological age of a particular user. For example, the second content can be a content that is appropriate for chronological age of a particular user, such as a content that is modified to remove or reduce profanity, violence, sexual content, and the like, for viewers within one or more particular age groups.

As noted above, in some embodiments, identification information can be obtained from watermarks that are imperceptibly embedded in either (or both) of the audio and image/video components of the first content. In some exemplary embodiments, an audio or video watermark extractor upon extracting the embedded watermark(s) from the first content accesses (e.g., using the Internet) a centralized database of secondary content to select a particular secondary content to be presented as the second content on the user device. Such secondary content at the database can be arranged in a manner that allows categorized storage and retrieval of the second content using the identification information. For example, the identification information can be used as an index (or pointer) to the stored secondary content.

The association of the secondary content with identification information can occur at any time after the primary content has been produced and distributed, perhaps even long after its initial release. For example, populating the secondary content database, and associating the secondary content with the primary content, can be carried out on an on-going basis as different forms of secondary content becomes available. This way, various formats or types of secondary content can be generated and added to the secondary database by content producers, content distributors or even third party contributors including content users. Therefore, the secondary content database can grow organically to fulfill a niche market without requiring the content producers to undertake economically infeasible secondary content production efforts.

In some embodiments, embedded watermarks in the first content additionally include timecode information that identifies the temporal location of a presented segment within the first content. For example, such a timecode can represent the temporal location of a segment with respect to the beginning of the first content. In some exemplary embodiments, the timecode can be embedded into the first content in the form of a counter that is monotonically incremented for successive content segments. The embedded timecodes, once detected at a watermark extractor, can be used in conjunction with the detected identification information to retrieve and present the second content in synchronization with the corresponding segments of the first content. To facilitate access and retrieval of the second content, the stored secondary content can be indexed using, for example, a combination of the identification information and the timecode.

Additionally or alternatively, in some embodiments, the first content is identified using fingerprinting techniques. A fingerprint, much like a fingerprint of an individual, produces a unique content identification mechanism that relies on inherent characteristic of the content. For example, a content fingerprint can be computed based on distribution of frequency components within a content, the energy of the content within a particular frequency band, and the like. Content fingerprints, which are often computed on a segment-by-segment basis, are stored at a fingerprint database along with additional meta data such as the content title, the content owner, and the like. Once a content has been distributed (e.g., presented by the first device 102 as described in connection with FIG. 1), the content that is received at a user device (e.g., the second device 106 in FIG. 1) can be analyzed (e.g., by a fingerprint computation component(s) 214b shown in FIG. 2). The fingerprint computation components 214b are configured to compute fingerprints for the received segments of multimedia content (or components therein) and to communicate the computed fingerprint values (e.g., through the communication unit 206) to a fingerprint database. The received content can thus be identified by obtaining a match between the computed fingerprints and fingerprints that reside at a database of known content. According to some embodiments, once the content has been identified using fingerprints, the associated second content can be obtained and provided to the user device for presentation to the user.

In yet other exemplary embodiments, the first content can include quick response (QR) codes that facilitate identification of the first content. QR codes that are in the form of two-dimensional barcodes are, for example, captured by a digital camera at the user device (e.g., the second device 106 in FIG. 1) and decoded to extract an identification information. The extracted identification information can then be used to access a database (e.g., through an Internet URL) that stores the associated secondary content.

The synchronization of the second content with the first content can be achieved via continuous or repeated recognition of the first content that is being presented, so that if the first content is viewed in a non-linear fashion (e.g. pause, rewind, skip, etc.) the second content continues to be presented in lock-step with the first content. For example, with reference to FIG. 1, the first content that is received at the second device 106 can be continually monitored to extract the embedded identification information from the received segments, and to retrieve and present the associated second content in synchronization with the first content on an on-going basis.

Figure 4:
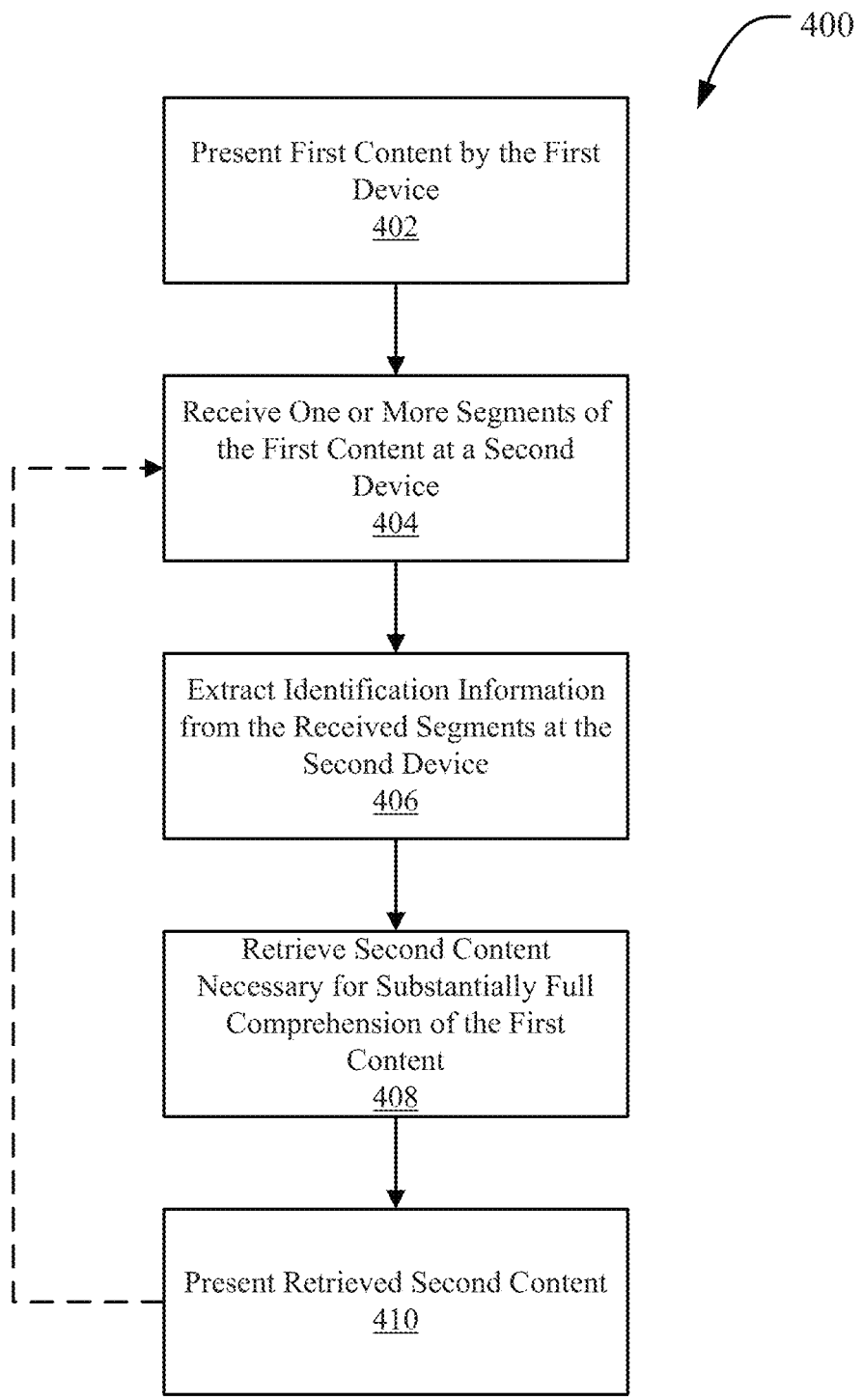
FIG. 4 illustrates a set of operations that may be carried out in accordance with another exemplary embodiment.

Referring back to FIG. 1, in some exemplary embodiments, the first device 102 is configured to the present the first content without special processing (e.g., the first device 102 is configured to operate as a typical television set). In these embodiments, the first content is embedded with watermarks prior to its arrival at the first device 102 (if watermarks are used for providing content identification). FIG. 4 illustrates a set of operations 400 that may be carried out in accordance with an exemplary embodiment upon arrival of the first content at a first device. For example, the operations 400 can be carried out when a first device receives a real-time content, or accesses a stored content for presentation. At 402, the first content is presented by a first device. At 404, one or more segments of the first content is received at a second device. For example, the one or more segments may correspond to one or more audio segments of the first content that are acoustically transmitted by the first device and received via a microphone of the second device. In another example, the one or more segments may correspond to one or more video frames of the first content that are optically transmitted by the first device and received via a camera of the second device.

Continuing with the operations 400 of FIG. 4, at 406 identification information is extracted from the received segments of the first content at the second device. Such identification information can include a content identifier, which can uniquely identify the content, as well as one or more timecodes that, for example, identify temporal locations of the received segments within the first content. At 408, the extracted identification information is used to retrieve a corresponding second content (or multiple second contents) that is necessary for full comprehension of the first content. As noted earlier, such second content typically resides at a database (e.g., a secondary content database) that is readily accessible to the second device. For example, the second device can access the database of secondary content directly through a network connection, such a Internet. In other examples, the second device may access the secondary content database indirectly through, for example, a gateway (e.g., a home gateway), a proxy, and the like. At 410, the retrieved second content is presented. The secondary content can be presented at 410 on a presentation device that is part of, or is in communication with, the second device. The operations 404 through 410 can be repeated for additional segments of the first content.

Presentation of the second content depends on the specific needs of the user, the availability of suitable secondary content and/or capabilities of the second device. For example, if the second device is equipped with, or is in communication with, a Braille reader (e.g., an electro-mechanical device for presenting Braille characters), a Braille secondary content is available, and the user preferences include a need for Braille, the second content can be presented as in Braille format. To facilitate the presentation of a specific selection of the secondary content, the second device may include a user preference file that specifies particular preferences of the user(s) of the second device. Such a file can be used to automatically retrieve and present the second content based on the stored preferences.

In one variation of the operations 400 of FIG. 4, the first device may additionally include a watermark embedding component that is configured to embed watermarks into the first content. This variation can be utilized when, for example, watermarks are used for identification purposes, and the first content does not include embedded watermarks. In such a scenario, the first device may be informed (e.g., by examining a particular field within the received file header, by attempting to extract embedded watermarks using a watermark extractor component, through a separate auxiliary channel, etc.) that the received first content does not include watermarks. In the absence of embedded watermarks, the first device can be configured to embed watermarks carrying content identification information into the first content before, or during, the presentation of the first content. The content identification information can be communicated to, or obtained by, the first device through a variety of techniques, including through closed caption data, through headers or other special fields that accompany the first content, through extraction of fingerprints from the first content and subsequent access of a remote database that contain the associated identification data corresponding to the extracted fingerprint, through additional sources of meta data, and the like.

Figure 5:
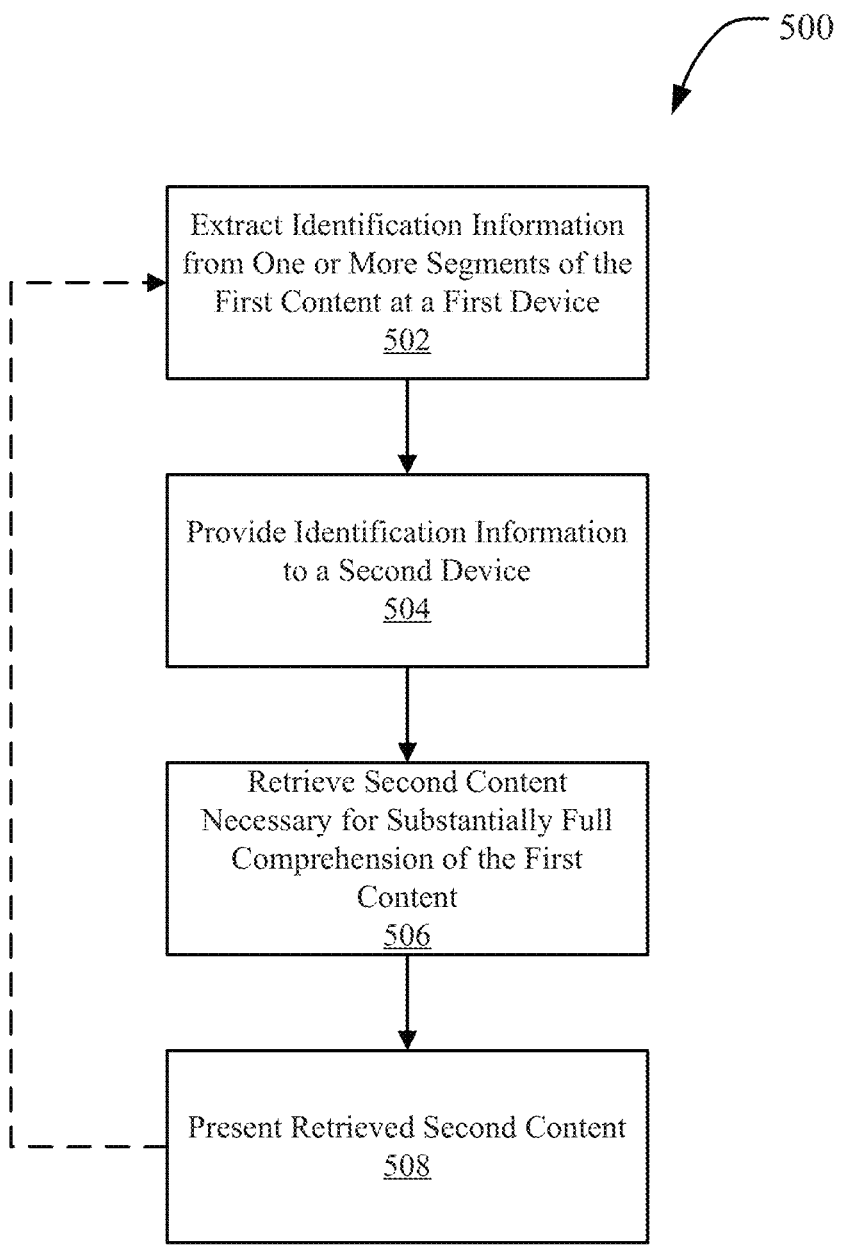
FIG. 5 illustrates a set of operations that may be carried out in accordance with another exemplary embodiment.

In some exemplary embodiments, the first device (e.g., device 102 that is illustrated in FIG. 1) is configured to process the first content to extract identification information prior to, or during, presentation of the first content. FIG. 5 illustrates a set of operations 500 that may be carried out in accordance with an exemplary embodiment upon reception of the first content at the first device. At 502, identification information is extracted from one or more segments of the first content at the first device. For example, the first device can be equipped with a watermark extractor and/or a fingerprint generation component that are configured to extract content identification information from one or more segments of the first content. Simultaneously, the first device may present the first content to a plurality of second, third, fourth, etc. devices and the associated users of those devices.

At 504, the extracted identification information is provided to the second device. For example, such identification information may be provided to the second device through a wired or wireless communication channel, through acoustic propagation, through optical (including infrared and ultraviolet) propagation, and the like. Additionally, the extracted identification information may subject to formatting and processing (not shown in FIG. 5), including but not limited to, encryption, error correction coding, format conversion, compression, modulation and other processing operations that may be needed for transmission of identification information to the second device.

Referring again to FIG. 5, at 506, the second content necessary for substantially full comprehension of the first content is retrieved. The operations at 506 can be similar to those described in connection with FIG. 4 at 408. At 508, the second content is presented in a similar manner as described in connection with FIG. 4. Operations 502 through 508 may be repeated for additional segments of the first content. Extraction of the identification information at the first device, as illustrated at step 502 in FIG. 5, can simplify the hardware/software requirements associated with the second device. This way, computationally expensive watermark or fingerprint extraction operations can be carried out only once at the first device (e.g., a computationally powerful device, with ample processing power and storage space that can be connected to the power outlet) without (1) requiring the second device to include such capabilities, and (2) having each of (potentially) a plurality of second devices independently duplicate watermark extraction or fingerprint generation operations for the same first content.

Figure 6:
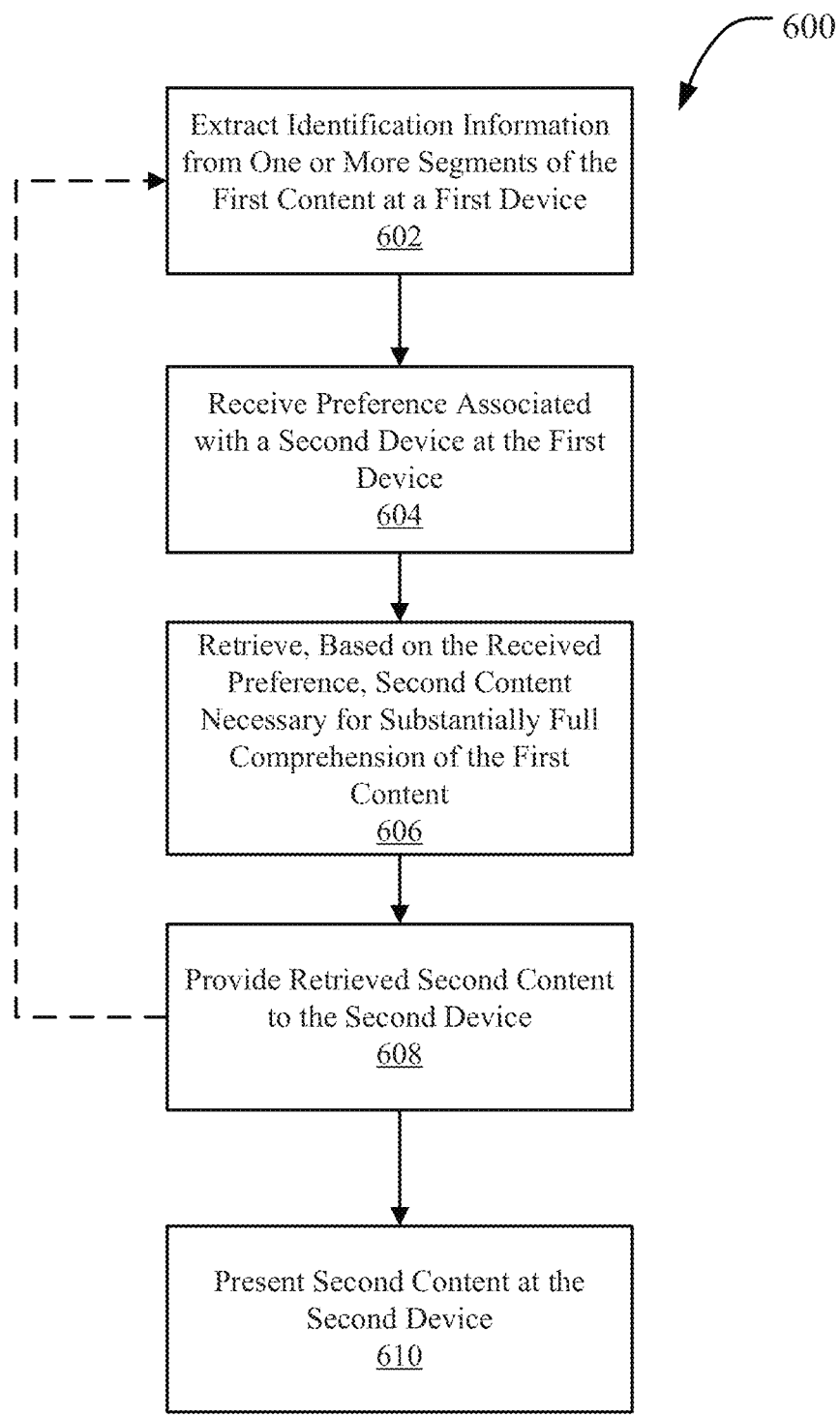
FIG. 6 illustrates a set of operations that may be carried out in accordance with another exemplary embodiment.

In some exemplary embodiments, the first device (e.g., device 102 that is illustrated in FIG. 1) is configured not only to process the first content to extract identification information prior to, or during, presentation of the first content, but to also retrieve the second content based on the extracted watermarks or fingerprints. To this end, FIG. 6 illustrates a set of operations 600 that may be carried out in accordance with an exemplary embodiment upon reception of the first content at the first device. At 602, identification information is extracted at the first device from one or more segments of the first content. Simultaneously, the first device may present the first content to a plurality of second, third, fourth, etc. devices and the associated users of those devices. At 604, one or more preferences from a second device is received. Such a preference, which may be received before or during the presentation of the first content, provides an indication to the first device as to the type and/or format of the second content that is needed by the second device. For example, such a preference may indicate that the second device requires a second content in Braille format.

At step 606 of FIG. 6, the second content necessary for full comprehension of the first content is retrieved based on the received preference of the second device. The operations at 606 are carried out by the first device. At 608, the retrieved second content is provided to the second device. For example, the second content may be provided to the second device through a wired or wireless communication channel, through acoustic propagation, by optical (including infrared and ultraviolet) propagation, and the like. At 610, the second content is presented at the second device. Presentation of the second content at 610 can be similar to that described in connection with FIGS. 4 and 5. The operations 602 through 608 may be repeated for additional segments of the first content but, as noted above, step 604 may be carried out once prior to, or during, the presentation of the first content. In some embodiments, the operations at 604 are repeated only on an as-needed basis to, for example, inform the first device of a new preference of the second device.

Compared to operations 500 of FIG. 5, the operations 600 of FIG. 6 require fewer capabilities for the second device(s). In particular, in operations 600 of FIG. 6, external network connectivity for accessing the second content is only needed at the first device. Such a configuration can, for example, be utilized at a home network, where the first device is configured to operate as a gateway, media center, or another central component of the home network that coordinates dissemination of the second content to a plurality of other devices within the home network.

In yet other exemplary embodiments, the reception of the preference associated with the second device may be carried out by presenting a plurality of choices for presentation of the second content, receiving a response indicative of the selection of a specific choice from the plurality of choices, and retrieving the second content from a storage location based on the indicated selection. Therefore, the first device (e.g., in cases where the first device retrieves the second content from the secondary content database) or the second device (e.g., in cases where the second device can access the secondary content database) can ascertain the types and/or formats of the second content that are available for use, and prompt a user to make a particular selection from the available choices. User selection can be provided through a variety of user interface devices, including but not limited to, a keyboard, a touch screen, a mouse, a voice command, a blow tube, a brainwave transmission device, and eye movement detection device, and the like. In some embodiments, the user can additionally control other aspects of the presentation of the second content (and/or the first content). For example, the user can use the above-mentioned user-interface devices (including software interface means) to pause, cue/rewind, change the volume, change the speed of presentation and/or change the selection of content to be presented.

In some exemplary embodiments, the second content can, additionally or alternatively, be tailored to provide a specific level of vocabulary. For example, a second content associated with a Shakespearean movie can include one or more dialog or speech tracks (or closed-caption tracks) that substitute easy-to-understand phrases in place of more sophisticated words or less commonly used phrases. The easy-to-understand phrases enable a person with a limited vocabulary, or with a learning disability, to fully comprehend the first content. In some embodiments, different versions of the second content at different levels of vocabulary is provided. This way, the level of difficulty of the vocabulary level provided by the second content can be increased or decreased, as needed. For example, a change in the difficulty level can be signaled by a change in a preference, as illustrated in operation 604 in FIG. 6.

In some embodiments, the second content can include a speech track (or a closed-caption track) that is in a different language than the spoken language in the first content that is being presented by the first device.

In yet another embodiment, the second content can provide parental control for the first content. For example, a second content may provide a PG-13 audio track, as a second content, for an R-rated first content. In this example scenario, the first content can be played on the first device with its original R-rated audio component (e.g., in the main room of a house) while, upon the detection of the identification information, the PG-13-rated audio track can be retrieved and played at the second device (e.g., in children's rooms). It should be noted that in some embodiments where the second content provides an alternate audio content (whether or not related to parental control), the original audio associated with the first content may be muted. The provision of parental control using the second content is not limited to the audio component but can also include an alternate version of all or portions of the video component of the first content that is presented at the second device.

In yet another embodiment, the second content enables comprehension of a cultural reference that is presented as part of the first content. For example, the second content can provide an explanation for clarifying one of a particular dialect, a historical reference, a geographical reference and the like. Analogously, the second content can provide an explanation corresponding to an encyclopedia entry and/or a dictionary entry.

It is understood that the various embodiments of the present disclosure may be implemented individually, or collectively, in devices comprised of various hardware and/or software modules and components. In describing the disclosed embodiments, sometimes separate components have been illustrated as being configured to carry out one or more operations. It is understood, however, that two or more of such components can be combined together and/or each component may comprise sub-components that are not depicted. Further, the operations that are described in various figures of the present application are presented in a particular sequential order in order to facilitate understanding of the underlying concepts. It is understood, however, that such operations may be conducted in a different sequential order, and further, additional or fewer steps may be used to carry out the various disclosed operations.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

A content that is embedded with watermarks in accordance with the disclosed embodiments may be stored on a storage medium or transmitted through a communication channel. In some embodiments, such a content that includes one or more imperceptibly embedded watermarks, when accessed by a content handling device (e.g., a software or hardware media player) that is equipped with a watermark extractor and/or a fingerprint computation component, can trigger a watermark extraction or fingerprint computation process to trigger the various operations that are described in this application.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   detecting, at a second device, an identification information that is embodied in a first content from at least one segment of the first content, the detecting carried out by capturing an acoustically propagated audio section of the first content using a microphone or a displayed video section of the first content using a camera while the first content is being presented by a first device, the detecting comprising processing the at least one segment from the captured audio section or video section using a processor to obtain the identification information, the identification information uniquely identifying the first content and providing an index to a location of a non-transitory storage medium where a second content resides; and
   in response to the detection of the identification information, triggering presentation of the second content on the second device, wherein the second content is necessary for full comprehension of one or more portions of the first content, and the second content comprises a speech portion that provides a different level of vocabulary in same language as the language associated with audio section of the first content being presented by the first device.

2. The method of claim 1, wherein the identification information is detected from one or more watermarks that are embedded in the at least one segment of the first content.

3. The method of claim 2, wherein the one or more watermarks include a timecode.

4. The method of claim 1, wherein the identification information is detected by computing one or more fingerprints from the at least one segment of the first content, the one or more fingerprints representing an inherent characteristic of the at least one segment of the first content.

5. The method of claim 1, wherein the second content facilitates accessibility of the first content to people with disabilities or special needs.

6. The method of claim 1, wherein the second content is presented using a haptic interface.

7. The method of claim 1, wherein the second content is presented in a different audio-visual modality than the first content.

8. The method of claim 1, wherein the second content is selected from a group of contents consisting of:
   a closed caption content,
   an audio content designed for consumption of hearing impaired persons,
   a video content designed for consumption of visually impaired persons,
   a Braille content,
   an audio content that includes a modified dialog portion,
   a dialog-only audio content,
   an audio description,
   a video content with enhanced contrast, or
   a video content with enhanced details.

9. The method of claim 1, wherein the second content comprises a speech portion that is presented in a different language than the corresponding speech portion of the first content being presented by the first device.

10. The method of claim 1, further comprising, in response to the detection of the identification information, muting an audio portion of the first content on the first device.

11. The method of claim 1, wherein the second content provides a particular level of parental control.

12. The method of claim 1, wherein the second content is presented in accordance with preferences associated with the second device.

13. The method of claim 1, wherein the second content enables comprehension of a cultural reference presented as part of the first content.

14. The method of claim 1, wherein the second content includes an explanation to clarify one of: a particular dialect, a historical reference, and a geographical reference.

15. The method of claim 1, wherein the second content corresponds to an encyclopedia entry or a dictionary entry.

16. The method of claim 1, wherein the second content is presented in synchronization with the first content.

17. The method of claim 1, wherein presentation of the second content comprises:
   presenting a plurality of choices for presentation of the second content,
   receiving a response indicative of selection of a specific choice from the plurality of choices, and
   retrieving the second content based on the response.

18. The method of claim 17, wherein receiving the response comprises receiving the response through one or more of:
   a voice command,
   a blow tube,
   a brainwave transmission device, or
   an eye movement detection device.

19. The method of claim 1, wherein:
   the at least one segment of the first content is received at the second device;
   detecting the identification information is carried out by the second device; and
   the second content is retrieved by the second device from a secondary content database.

20. The method of claim 1, wherein the second content is presented as text in a language different from language of the first content that is being presented.

21. A method comprising:
   detecting, at a second device, an identification information that is embodied in a first content from at least one segment of the first content, the detecting carried out while the first content is being presented by a first device, the detecting comprising processing the at least one segment using a processor to obtain the identification information which uniquely identifies the first content and an index to a location of a second content; and
   in response to the detection of the identification information, triggering presentation of the second content on the second device, wherein the second content is necessary for full comprehension of one or more portions of the first content, wherein the second content comprises a speech portion that provides a different level of vocabulary than corresponding speech portion associated with the first content being presented by the first device, and wherein the different level of vocabulary is presented while the first content is being presented by the first device and the different level of vocabulary is in same language as the language of the corresponding speech portion associated with the first content that is being presented by the first device.

22. The method of claim 21, wherein the different level of vocabulary is adjustable so as to enable an increase or decrease of difficulty associated with the vocabulary level.

23. A device, comprising:
   a processor; and
   a memory comprising processor executable code, the processor executable code, when executed by the processor, configures the device to:
   capture an acoustically propagated audio section of a first content using a microphone or a displayed video section of the first content using a camera while the first content is being presented by another device;
   detect an identification information from at least one segment of the captured audio section or video section, the identification information uniquely identifying the first content and providing an index to a location of a non-transitory storage medium where a second content resides; and
   in response to the detection of the identification information, trigger presentation of the second content by the device, wherein the second content is necessary for full comprehension of one or more portions of the first content, and the second content comprises a speech portion that provides a different level of vocabulary in same language as the language associated with the audio section of the first content being presented by the another device.

24. A computer program product, embodied on a non-transitory computer readable medium, comprising:
   program code for detecting, at a second device, an identification information that is embodied in a first content from at least one segment of the first content, the detecting carried out by capturing an acoustically propagated audio section of the first content using a microphone or a displayed video section of the first content using a camera while the first content is being presented by a first device, the detecting comprising processing the at least one segment using a processor to obtain the identification information, the identification information uniquely identifying the first content and providing an index to a location of a non-transitory storage medium where a second content resides; and
   program code for, in response to the detection of the identification information, triggering presentation of the second content by the second device, wherein the second content is necessary for full comprehension of one or more portions of the first content, and the second content comprises a speech portion that provides a different level of vocabulary in same language as the language associated with the audio section of the first content being presented by the first device.

25. A device, comprising:
   an identification code detector configured to detect an identification information from at least one segment of a first content while the first content is being presented by another device, the identification information uniquely identifying the first content and providing an index to a location of a non-transitory storage medium where a second content resides, the at least one segment of the first content having been obtained from an acoustically propagated audio section of the first content that is captured by a microphone or a displayed video section of the first content that is captured by a camera; and
   a trigger component configured to, in response to the detection of the identification information, trigger presentation of a second content by the device, wherein the second content is necessary for full comprehension of one or more portions of the first content, and the second content comprises a speech portion that provides a different level of vocabulary in same language as the language associated with the audio section of the first content being presented by the another device.

26. The device of claim 25, wherein the identification code detector is configured to extract one or more watermarks that are embedded in the at least one segment of the first content.

27. The device of claim 25, wherein the identification code detector is configured to compute one or more fingerprints from the at least one segment of the first content, the one or more fingerprints representing an inherent characteristic of the at least one segment of the first content.

28. The device of claim 25, wherein the second content facilitates accessibility of the first content to people with disabilities or special needs.

29. The device of claim 25, further comprising a haptic interface configured to present the second content.

30. The device of claim 25, further comprising a user interface configured to present the second content selected from a group of contents consisting of:
   a closed caption content,
   an audio content designed for consumption of hearing impaired persons,
   a video content designed for consumption of visually impaired persons,
   a Braille content,
   an audio content that includes a modified dialog portion,
   a dialog-only audio content
   an audio description,
   a video content with enhanced contrast, or
   a video content with enhanced details.

31. The device of claim 25, further comprising a user interface configured to present the second content comprising a speech portion that is presented in a different language than the corresponding speech portion of the first content being presented by the first device.

32. The device of claim 25, further configured to, in response to the detection of the identification information, mute an audio portion of the first content on the first device.

33. The device of claim 25, further comprising a user interface configured to present the second content to enable comprehension of a cultural reference presented as part of the first content.

34. The device of claim 25, further comprising a user interface configured to present the second content that corresponds to an encyclopedia entry or a dictionary entry.

35. The device of claim 25, further configured to present the second content in synchronization with the first content.

36. The device of claim 25, further configured to:
   present a plurality of choices for presentation of the second content;
   receive a response indicative of selection of a specific choice from the plurality of choices; and
   retrieve the second content based on the response.

37. The device of claim 36, configured to receive the response that provided through one or more of:
   a voice command,
   a blow tube,
   a brainwave transmission device, or
   an eye movement detection device.

38. The device of claim 25, further comprising a communication unit configured to communicate with a secondary content database to retrieve the second content.

39. The method of claim 25, the second content is presented as text in a language different from language of the first content that is being presented.

40. A device comprising:
   an identification code detector configured to detect an identification information, from at least one segment of a first content, which uniquely identifies the first content and an index to a location of a second content while the first content is being presented by another device;
   a trigger component configured to, in response to the detection of the identification information, trigger presentation of a second content by the device, wherein the second content is necessary for full comprehension of one or more portions of the first content; and
   a user interface configured to present the second content comprising a speech portion that provides a different level of vocabulary than corresponding speech portion associated with the first content being presented by the another device, wherein the different level of vocabulary is presented while the first content is being presented by the another device and the different level of vocabulary is presented in same language as the language of the corresponding speech portion associated with the first content that is being presented by the another device.

41. The device of claim 40, wherein the different level of vocabulary is adjustable so as to enable an increase or decrease of difficulty associated with the vocabulary level.

\* \* \* \* \*